(12) United States Patent
Rosenberger et al.

(10) Patent No.: US 11,901,533 B2
(45) Date of Patent: Feb. 13, 2024

(54) SEALED BATTERY MODULE WITH COOLING AND HEATING

(71) Applicant: Caterpillar Inc., Peoria, IL (US)

(72) Inventors: Adam R. Rosenberger, Washington, IL (US); Brian R. Bell, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 141 days.

(21) Appl. No.: 17/337,193

(22) Filed: Jun. 2, 2021

(65) Prior Publication Data

US 2022/0393262 A1    Dec. 8, 2022

(51) Int. Cl.
| | |
|---|---|
| *H01M 10/48* | (2006.01) |
| *H01M 10/613* | (2014.01) |
| *H01M 10/615* | (2014.01) |
| *H01M 10/647* | (2014.01) |
| *H01M 10/653* | (2014.01) |
| *H01M 10/6557* | (2014.01) |
| *H01M 10/6571* | (2014.01) |
| *H01M 10/625* | (2014.01) |

(Continued)

(52) U.S. Cl.
CPC ......... *H01M 10/63* (2015.04); *H01M 10/486* (2013.01); *H01M 10/613* (2015.04); *H01M 10/615* (2015.04); *H01M 10/647* (2015.04); *H01M 10/653* (2015.04); *H01M 10/6557* (2015.04); *H01M 10/6571* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 2011/0262784 A1* | 10/2011 | Suga | .................... | H01M 10/633 |
| | | | | 429/62 |
| 2012/0247107 A1* | 10/2012 | Balk | .................... | H01M 50/224 |
| | | | | 429/100 |

(Continued)

FOREIGN PATENT DOCUMENTS

| | | |
|---|---|---|
| CN | 107275711 A | 10/2017 |
| CN | 207800824 U | 8/2018 |

(Continued)

OTHER PUBLICATIONS

Written Opinion and International Search Report for Int'l. Patent Appln. No. PCT/US2022/028898, dated Sep. 9, 2022 (14 pgs).

*Primary Examiner* — Lisa S Park
(74) *Attorney, Agent, or Firm* — Lee & Hayes, PLLC

(57) ABSTRACT

A battery module includes a housing, assembled from a first side wall, a second side wall, a first end plate, and a second end plate, is configured to support a plurality of battery cells. The battery module also includes a heating pad and a cooling plate that are configured to regulate a thermal state of the plurality of battery cell. The heating pad is disposed substantially adjacent to the plurality of battery cells and the cooling plate is disposed adjacent to the heating pad opposite the plurality of battery cells. A controller associated with the battery module is configured receive an indication of battery temperature and active one of the heating pad or the cooling plate based at least on the battery temperature of the plurality of battery cells.

20 Claims, 9 Drawing Sheets

(51) Int. Cl.
*H01M 10/633* (2014.01)
*H01M 10/637* (2014.01)
*H01M 10/6554* (2014.01)
*H01M 10/6556* (2014.01)
*H01M 10/6568* (2014.01)
*H01M 50/204* (2021.01)
*H01M 10/63* (2014.01)

(56) References Cited

U.S. PATENT DOCUMENTS

| | | | |
|---|---|---|---|
| 2014/0220397 A1* | 8/2014 | Hirsch | H01M 10/613 165/185 |
| 2015/0217707 A1* | 8/2015 | Tanigaki | B60L 50/66 180/65.1 |
| 2016/0020496 A1* | 1/2016 | Burrows | H01M 10/655 429/62 |
| 2016/0149177 A1* | 5/2016 | Sugeno | H01G 11/76 429/151 |
| 2016/0222631 A1* | 8/2016 | Kohno | H01M 10/647 |
| 2017/0123011 A1* | 5/2017 | Cha | G08C 19/02 |
| 2017/0125861 A1* | 5/2017 | Machida | H01M 10/613 |
| 2017/0263903 A1* | 9/2017 | Petrevski | H01M 50/209 |
| 2018/0034117 A1 | 2/2018 | Bang et al. | |
| 2020/0243926 A1 | 7/2020 | Dawley et al. | |
| 2020/0373638 A1 | 11/2020 | Lee | |
| 2021/0016649 A1* | 1/2021 | Sasmaz | H01M 50/262 |

FOREIGN PATENT DOCUMENTS

| | | |
|---|---|---|
| CN | 208889811 U | 5/2019 |
| CN | 110752416 A | 2/2020 |
| CN | 210956919 U | 7/2020 |
| CN | 112397806 B | 9/2022 |

\* cited by examiner

SEALED BATTERY MODULE WITH COOLING AND HEATING

TECHNICAL FIELD

The present disclosure relates to systems configured to improve battery life and support battery functionality. More specifically, the present disclosure relates to a heating system and a cooling system that are controlled to activate based on the thermal state of the battery.

BACKGROUND

Battery modules are used in a variety of applications in order to provide and store energy. For example, battery modules are increasingly implemented in vehicles, equipment, and other machines. Additionally, battery modules are commonly characterized by a thermal range within which the battery module effectively outputs an electric current for the application that the battery module is being utilized for. During startup and normal operation, with the temperature of the battery module may fluctuate. As a result, in some applications the battery module is actively heated and/or cooled to maintain effective operation. For example, a heating pad or other heating element can be utilized in relatively cold operating environments to increase the battery temperature above a minimum temperature threshold so that the battery module can effectively output the electrical current. Alternatively, or in addition, a cooling plate can be utilized in relatively warm operating environments to decrease the battery temperature below a maximum temperature threshold, and to prevent elevated battery temperature that cause damage to the battery module. However, existing systems commonly lack the ability to effectively maintain the temperature of battery modules within a targeted efficiency range during use.

An example battery module is described in Chinese Patent No. 2078000824 (hereinafter referred to as "the '824 reference"). In particular, the '824 reference describes a thermal regulation apparatus for a battery. The thermal regulation apparatus includes a plurality of cooling plates that are disposed adjacent to the battery, and a plurality of heating elements that are positioned on the cooling plates opposite the battery. Additionally, the plurality of heating elements are in thermal contact with a relatively small surface area of the cooling plate. Due to this configuration, the heating elements of the '824 reference must heat the cooling plate in order to transfer thermal energy to the battery. Further, because the heating elements described in the '824 reference are in thermal contact with a relatively small surface area of the cooling plate, the period of time between the activation of the heating elements and the provision of thermal energy to the battery is extended. As a result, it may be undesirable, or not possible, to use the apparatus of the '824 reference in applications in which lengthy start up times are prohibitive.

Examples of the present disclosure are directed toward overcoming the deficiencies described above.

SUMMARY OF THE INVENTION

Examples of the present disclosure are directed to a system that includes a housing comprising a first side wall, a second side wall disposed opposite the first side wall, a first end plate coupled to the first side wall and the second side wall, a second end plate coupled to the first side wall and the second side wall, the second end plate disposed opposite the first end plate, and a gap pad extending from the first side wall to the second side wall, and from the first end plate to the second end plate, the gap pad being disposed substantially perpendicular to the first side wall, the second side wall, the first end plate, and the second end plate. Additionally, the housing is configured to support a plurality of battery cells. Further, the system can include a heating pad comprised of a heating element configured to raise a temperature of the plurality of battery cells, a first surface disposed adjacent to the gap pad, and a second surface opposite the first surface. The system also includes a cooling plate configured to lower the temperature of the plurality of battery cells, the cooling plate including a coolant channel configured to direct coolant through at least part of the cooling plate, the cooling plate having a third surface disposed adjacent to the second surface of the heating pad, and a fourth surface opposite the third surface. Accordingly, the system includes a controller configured to cause energy to be directed from a power source to the heating element based at least in part on the temperature of the plurality of battery cells being less than a first temperature threshold and cause coolant to be directed from a coolant source to the coolant channel based at least in part on the temperature of the plurality of battery cells being greater than a second temperature threshold, the second temperature threshold being greater than the first temperature threshold.

Further examples of the present disclosure are directed to a battery module that includes a plurality of battery cells, a gap pad that is adhered to the plurality of batteries, and a housing that includes a first end plate, a second end plate disposed opposite the first end plate, a first side plate extending from the first end plate to the second end plate, and a second side plate disposed opposite the first side plate and extending from the first end plate to the second end plate, wherein the plurality of battery cells is disposed between the first end plate and the second end plate, and between the first side plate and the second side plate. Additionally, the battery module includes a heating pad comprising a first surface in contact with the gap pad and a second surface, wherein the first surface disposed adjacent to the gap pad and includes a heating element that provides thermal energy to the plurality of battery cells via the gap pad. Similarly, the battery module includes a cooling plate comprising a third surface in contact with the second surface and a fourth surface, the cooling plate configured to direct coolant through a coolant channel to remove thermal energy from the plurality of battery cells via the heating pad and the gap pad.

Still further examples of the present disclosure are directed to a method that includes connecting a first side plate to a first end plate, connecting the first side plate to a second end plate disposed opposite the first end plate, the first side plate extending substantially perpendicular to the first end plate and the second end plate, connecting a second side plate to the first end plate and the second end plate, the second side plate extending substantially parallel to the first side plate, the first end plate, the second end plate, the first side plate, and the second side plate forming at least part of a battery module housing, connecting a center plate to the first end plate and the second end plate, the center plate extending substantially parallel to the first side plate and the second side plate, and connecting a front plate to the first end plate, the front plate having a set of high voltage terminals configured to form an electrical connection with a plurality of battery cells disposed adjacent to the center plate. Additionally, the method can include providing a gap pad forming a bottom surface of the battery module housing and connecting a heating pad to the battery module housing, the heating pad having a first surface in contact with the gap pad, and a second surface opposite the first surface. Further, the method can include connecting a cooling plate to the battery module housing, the cooling plate having a third surface in contact with the second surface, and a fourth surface opposite the third surface.

DETAILED DESCRIPTION

Systems and techniques described below are directed to heating systems and cooling systems for battery modules. As will be described in greater detail below, such example systems may include a cooling plate, a heating pad, and a plurality of batteries thermally connected to the cooling plate and the heating pad. The example systems described herein are configured to maintain the temperature of the plurality of batteries within a desired range in order to maximize efficient operation of the batteries and prevent potential damaged caused by operation outside of this range.

Figure 1:
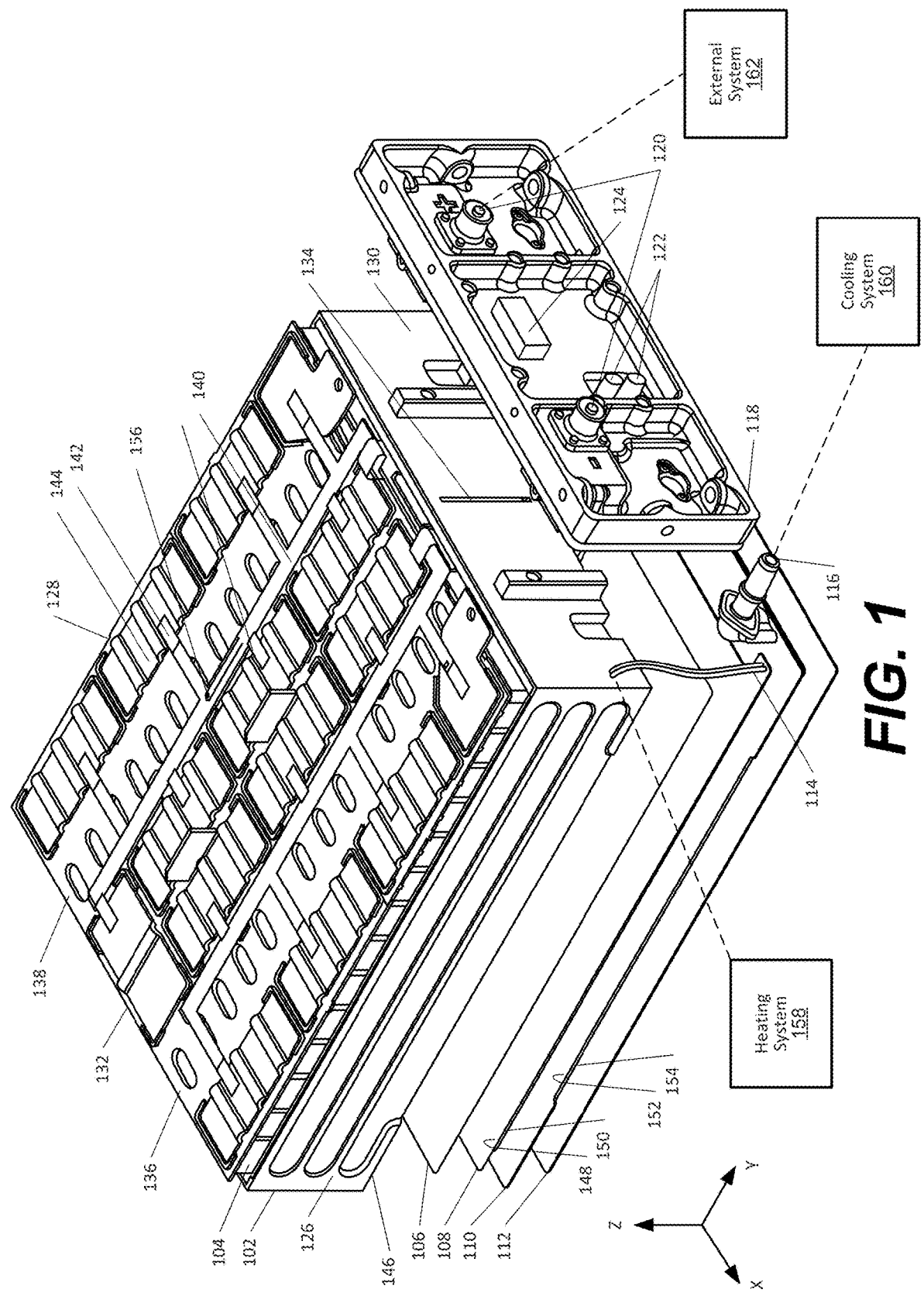
FIG. 1 illustrates an exemplary battery module including a plurality of battery cells secured by a battery module housing and thermally regulated by a heating system and a cooling system according to examples of the present disclosure.

FIG. 1 illustrates an exemplary battery module 100. For the purposes of this disclosure, the battery module 100 is depicted and described as including a battery module housing 102, one or more battery cells 104, a gap pad 106, a heating pad 108, a cooling plate 110, and a slide plate 112. The heating pad 108 can be associated with a heating circuit 114 that provides power to internal components of the heating pad 108. Additionally, the cooling plate 110 can be associated with a coolant connector 116 that enables coolant to be provided to the cooling plate 110. The coolant can be distributed throughout internal channels of the cooling plate 110 to cool the battery module 100. Further, a front plate 118 of the battery module 100 can be connected to the battery module housing 102 and provide one or more high voltage terminals 120 that are in electrical communication with the one or more battery cells 104, one or more low voltage terminals 122 that are in electrical communication with a controller 124 that is configured to monitor the battery module 100. Generally, the battery module 100 and the one or more battery cells 104 are contemplated as utilizing lithium ion battery technology to store electrical power and distribute the stored electrical power at a battery module voltage and a battery module amperage. The power distribution and power storage characteristics of the battery module 100 are defined at least in part on the configurations of the one or more battery cells 104 included in the battery module 100. In further examples, the battery module 100 may embody any other type of battery technology that converts chemical energy directly to electrical energy by utilizing a difference in bond energies of the compounds utilized in the construction of the battery module 100. Further, the one or more battery modules 100 described herein can be designed such that redox reactions can occur when electrons move through an external portion of a high voltage circuit associated with the one or more battery cells 104 (e.g., via the high voltage terminals 120.

The battery module housing 102 can include a first side wall 126, a second side wall 128, a first end plate 130, and a second end plate 132. Additionally, the battery module housing 102 can include a central wall 134 that is located between a first battery cell stack 136 and a second battery cell stack 138. In particular, the battery module housing 102 can be configured to receive the one or more battery cells 104 of the first battery cell stack 136 and the second battery cell stack 138. Additionally, the battery module housing 102 can be configured to secure the one or more battery cells 104 in electrical communication with the high voltage terminals 120 and substantially prevent shifting, dislocating, and other unintentional repositioning of the one or more battery cells 104. Further, the battery module housing 102 can be configured to secure the one or more battery cells 104 to an internal circuit 140 that electrically connects the high voltage terminals 120 with the one or more battery cells via or more battery connectors 142 and one or more busbars 144.

In some examples, the battery module housing 102 is assembled from the first side wall 126, the second side wall 128, the first end plate 130, and the second end plate 132. In particular, first side wall 126 and the second side wall 128 can be configured to extend substantially perpendicular from the first end plate 130 to the second end plate 132 to form the battery module housing 102. Additionally, the central wall 134 can be configured to extend substantially parallel to the first side wall 126 and the second side wall 128 to divide the battery module housing 102 into two substantially equivalent portions. Accordingly, the first end plate 130 can define a first end of the battery module 100 and can include one or more battery connectors 142 that enable the high voltage terminals 120 to contact the internal circuit 140 of the battery module 100. Further, the first end plate 130 can be attached to the front plate 118 of the battery module 100, such that the internal circuit 140 is electrically connected with the one or more high voltage terminals 120 via the one or more battery connectors 142, the coolant connector 116 extends from the cooling plate 110 through an opening in the front plate 118, and/or the controller 124 is in electrical communication with an electronic control module (ECM) via the low voltage terminals 122, wherein the ECM is associated with the external system 162 and controls for the external system 162.

In some examples the second end plate 132 defines a second end of the battery module that is opposite of the first end defined by the first end plate 130. Additionally, the second end plate 132 can extend substantially parallel to the first end plate 130. The first end plate 130 and the second end plate 132 can be configured to have substantially similar sizes. More specifically, the first end plate 130 can be defined by a first end plate height (e.g. a distance the first end plate 130 extends along the Z-axis), a first end plate width (e.g. a distance the first end plate 130 extends along the X-axis), and a first end plate thickness (e.g. a distance the first end plate 130 extends along the Y-axis). Additionally, the second end plate 132 can be defined by a second end plate height (e.g. a distance the second end plate 132 extends along the Z-axis), a second end plate width (e.g. a distance the second end plate 132 extends along the X-axis), and a second end plate thickness (e.g. a distance the second end plate 132 extends along the Y-axis). Accordingly, the first end plate height can be substantially equivalent to the second end plate height, the first end plate width can be substantially equivalent to the second end plate width, and/or the first end plate thickness can be substantially equivalent to the second end plate thickness. Alternatively, or in addition, one or more of the first end plate height, the first end plate width, and the first end plate thickness can differ from the second end plate height, the second end plate width, and the second end plate thickness to accommodate the heating circuit 114, the coolant connector 116, the front plate 118, the one or more connectors, and other interfaces between the battery module housing 102 and other components associated with the battery module 100.

In some examples, the battery module housing 102 can be assembled to surround the first battery cell stack 136 and the second battery cell stack 138 with the first side wall 126, the second side wall 128, the first end plate 130, and the second end plate 132. In particular, the first battery cell stack 136 and the second battery cell stack 138 can be compressed by the battery module housing 102 via compressive force applied by the first end plate 130 and the second end plate 132. More specifically, the one or more battery cell stacks can be assembled from the one or more battery cells 104 and placed between the first end plate 130 and the second end plate 132, wherein the first end plate 130 and the second end plate 132 can be utilized to apply a compressive force to the one or more battery cells 104. Additionally, the first side wall 126 and the second side wall 128 can be secured to the first end plate 130 and the second end plate 132 to form the battery module housing 102 around the one or more battery cells 104. It should be noted that the first side wall 126 can extend substantially perpendicular to the first end plate 130 and the second end plate 132, wherein the first side wall 126 can define a first side of the battery module housing 102 and can be connected to the first end plate 130 and the second end plate 132. Similarly, the second side wall 128 can extend substantially parallel to the first side wall 126 and disposed opposite of the first side wall 126, wherein the second side wall 128 can define a second side of the battery module housing 102 and can be connected to the first end plate 130 and the second end plate 132. The first side wall 126, the second side wall 128, the first end plate 130, and the second end plate 132 can be connected via welding, connectors, fasteners, and/or other joints. Further, the first side wall 126 and the second side wall 128 can be defined at least in part by a side plate length that is determined at least in part on the one or more battery cells 104 and the configuration of the one or more battery cells 104.

In some examples, a bottom surface 146 of the battery module housing 102 and the one or more battery cells 104 can be substantially planar. In particular, the bottom surface 146 can be substantially planar but include uneven portions where the bottom surface 146 is disjointed due to the positioning of the one or more battery cells 104. More specifically, the one or more battery cells 104 can be defined at least in part by one or more cell heights, wherein the one or more cell heights can include minor deviations that cause the bottom surface 146 the one or more battery cells 104 to have uneven portions. The minor deviations can be caused by the compression of the one or more battery cells 104, the construction of the one or more battery cells 104, the alignment of the one or more battery cells 104 to form the first battery cell stack 136 and/or the second battery cell stack 138, and/or other fluctuations in the construction process of the battery module 100. Accordingly, the bottom surface 146 can be mated with a gap pad 106 that is configured to reduce and/or eliminate the uneven portions of the bottom surface 146 by conforming to the uneven portions. The gap pad 106 can comprise a malleable layer that is configured to create a substantially flat surface, wherein the gap pad 106 is configured to deform to fit the uneven portions of the bottom surface 146 of the one or more battery cells 104.

In some examples, the gap pad 106 can comprise the malleable layer that is configured to deform when applied to the bottom surface 146 of the battery module housing 102 and the one or more battery cells 104 and create the substantially flat surface on the bottom surface 146. In particular, the malleable layer and/or the gap pad 106 can be formed from a polymeric material that is configured to deform when applied to uneven portions of a surface. Alternatively, the malleable layer/gap pad 106 can be replaced with a liquid layer that is applied to the heating pad 108 and fills a volume of space between the one or more battery cells 104 and the heating pad 108 when the battery module 100 is assembled. Additionally, the gap pad 106 can be formed from a polymeric material that is configured to behave as a thermal conductor and an electrical insulator. More specifically, the gap pad 106 can be configured to have a high thermal conductivity and a high electrical resistivity. Accordingly, the gap pad 106 can be adhered to the bottom surface 146, create a substantially flat surface adjacent to the bottom surface 146, substantially permit thermal energy to be transferred to and/or from at least the one or more battery cells 104 via the gap pad 106, substantially prevent electrical current from traversing the gap pad 106, and create an interface between the one or more battery cells and the heating pad 108. Further, the gap pad 106 can be constructed from a variety of materials that includes polyacrylics, polyalkenes, polyalkynes, polyurethanes, polyvinyls, and/or other polymeric substrates. Alternatively, or in addition, the gap pad 106 can be constructed from an epoxy, a silicone, a siloxane, or other similar materials that are configured to provide a thermally conductive and electrically insulative interface between the one or more battery cells 104 and the heating pad 108/the cooling plate 110.

It should be noted that, independent of how the gap pad 106, the malleable layer, or the fluid layer is configured, a thermal interface material is installed between the one or more battery cells 104 and the heating pad 108. The thermal interface material can commonly be configured as the gap pad 106 and will commonly serve the similar purposes as the gap pad 106 as described above and below. However, the battery module 100 is not limited to utilization of a literal pad, but instead can be configured to utilize any thermal interface material that is installed between the heating pad 108 and the battery cells 104 and enables thermal energy to be transferred between the battery cells 104, the heating pad 108, and the cooling plate 110.

In some examples, the heating pad 108 can be in contact with the gap pad 106 to provide thermal energy to the one or more battery cells 104 via the gap pad 106. In particular, the heating pad 108 can be connected to and/or in physical contact with the substantially flat surface provided by the gap pad 106 opposite the one or more battery cells 104. The heating pad 108 can be a substantially flat substrate that includes the heating circuit 114, internal circuit leads, and ones or more heating elements. The heating circuit 114 of the heating pad 108 can be connected to a power source via an external heating system 158 and/or via an electrical connection to the internal circuit 140. Additionally, the heating pad 108 can include a first heating pad surface 148 and a second heating pad surface 150. The first heating pad surface 148 can be an upper surface of the heating pad 108 that is adjacent to the gap pad 106. Further the first heating pad surface 148 can include the heating element that is printed on, embedded into, coupled to, and/or otherwise attached to the substrate of the heating pad 108. The second heating pad surface 150 can be a lower surface of the heating pad 108 that is in physical contact with the cooling plate 110 when the heating pad 108 is couple to the gap pad 106. Accordingly, power received via the heating circuit 114 can be distributed to the heating element via the internal circuit leads to generate thermal energy that is provided to the one or more battery cells 104 via the gap pad 106.

Figure 2:
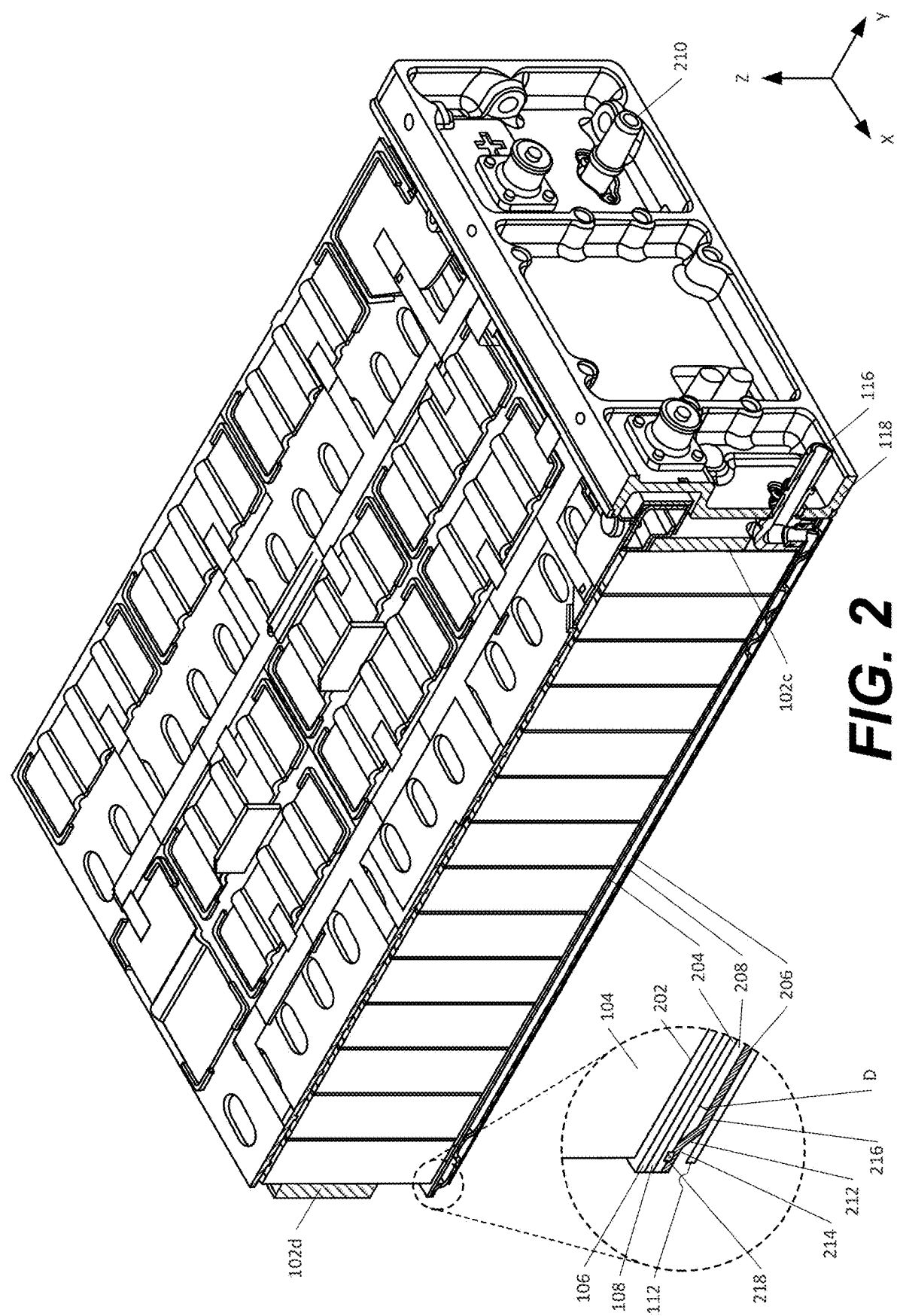
FIG. 2 illustrates a cross-sectional view of the battery module including a view of a heating pad and a cooling plate according to examples of the present disclosure.
Figure 3:
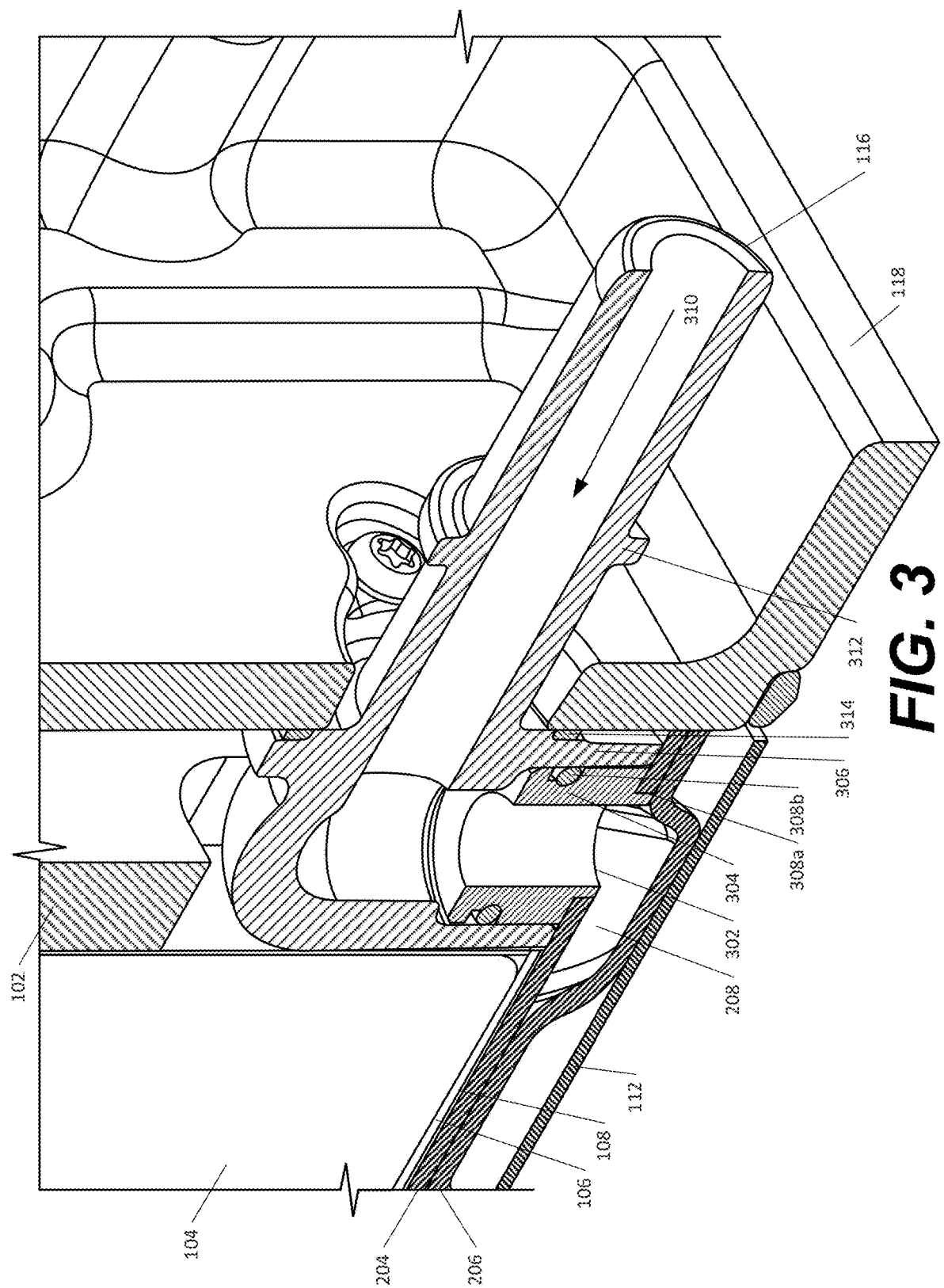
FIG. 3 illustrates a cross-sectional view of the cooling plate and a coolant connector that connects the cooling plate to a coolant source according to examples of the present disclosure.

In some examples, the cooling plate 110 can be in contact with the heating pad 108 to extract thermal energy from the one or more battery cells 104 via the gap pad 106 and the heating pad 108. In particular, the cooling plate 110 can be disposed on, in contact with and/or coupled to the lower surface of the heating pad 108. The cooling plate 110 can be an assembly, constructed from metallic, polymeric, plastic, rubber, and/or other material plates, that is configured to channel coolant in proximity to the one or more battery cells 104. In some examples, the cooling plate 110 includes an upper plate, a lower plate, a coolant channel, and a coolant connector 116. It should be noted that FIG. 2 and FIG. 3 depict these components in greater detail. Additionally, the cooling plate 110 can be in fluid communication with a cooling system 160, external to the battery module, that provides coolant to the cooling plate 110 for extracting thermal energy from the one or more battery cells 104. Further the cooling plate 110 can be comprised of a first cooling plate surface 152 and a second cooling plate surface 154, wherein the first cooling plate surface 152 is an upper surface of the cooling plate 110 that is in contact with the second heating pad surface 150 and the second cooling plate surface 154 is a lower surface of the cooling plate 110. Accordingly, coolant received via the coolant connector 116 can be directed through coolant channels of the cooling plate 110 to extract thermal energy from the one or more battery cells 104 via the gap pad 106 and the heating pad 108.

In some examples, a slide plate 112 can be provided to the battery module 100 to protect the heating pad 108 and the cooling plate 110 during installation of the battery module 100 within an external housing (not illustrated). In particular, the slide plate 112 can coupled to the second cooling plate surface and configured to be exposed to an interior of the external housing, wherein the slide plate 112 enables the battery module to be installed within the external housing during construction and/or assembly of a battery. Additionally, the slide plate can be a metallic, polymeric, or ceramic sheet that is configured to protect the battery module 100 and other components of the battery module 100 during construction and/or assembly of the battery.

In some examples, the front plate 118 is mounted on the first end plate 130 of the battery module housing 102 and is configured to form a first end of the battery module housing 102. In particular, the front plate 118 can be defined by a front plate height and a front plate width, wherein the front plate height exceeds the first end plate height and the front plate width exceeds the front plate width. Additionally, the front plate height can be approximately equal to or less than an external housing height and the front plate width can be approximately equal to or less than the external housing width. Accordingly, the front plate 118 can be configured to substantially align with and/or fit within the external housing upon assembly and/or construction of the battery module 100, wherein the battery module 100 is inserted into the external housing and the front plate 118 is exposed on the first end of the external housing. Further, the front plate 118 can be configured to fit wholly within the exterior housing or extend from the exterior housing, forming a fluid tight seal between the front plate 118 and the exterior housing.

In some additional examples, and as noted above, the one or more high voltage terminals 120 are electrically connected with the one or more battery cells 104 of the battery module 100 via the one or more battery connectors 142 and the internal circuit 140. Additionally, the one or more battery connectors 142 can be configured as an electrical bridge between a group of the one or more battery cells 104, connected by a busbar 144, and the internal circuit 140. Accordingly, the one or more battery cells 104 can be in electrical communication with the internal circuit 140 of the battery module 100, wherein the internal circuit 140 is a high voltage circuit in electrical communication with the one or more busbars 144, the battery connector(s) 142, and the high voltage terminals 120 of the battery module 100. Further, the one or more high voltage terminals 120 can be in electrical communication with the internal circuit 140 while the front plate 118 is mounted to the first end plate 130 of the battery module, enabling external systems (e.g., a vehicle, a power grid, a system, etc.) to connect with the high voltage terminals 120 and form an electrical connection with the one or more battery cells 104.

As noted above, the one or more battery cells 104 are electrically connected via the busbars 144 and the internal circuit 140. Additionally, the one or more battery cells 104 can be configured to provide electrical power to the external system 162 (e.g., a machine, a vehicle, etc.) that is electrically coupled to the one or more battery cells 104 via the high voltage terminals 120. In particular, the one or more battery cells 104 can be arranged in parallel, in series, and/or in groups of the battery cells 104, wherein the battery cells 104 within a group can be in series (or in parallel) while the groups are in parallel (or in series). Further, the one or more battery cells 104 can be configured to provide the electrical power at a desired amperage output, a desired voltage output, and/or a desired power output associated with the external system 162. It should be noted that individual battery cells 104 can be configured, in series and/or in parallel, to provide any power capacity, voltage, amperage, etc. Alternatively, or in addition, the battery module 100, and the one or more battery cells 104 within the battery module 100, can be electrically coupled to one or more additional battery modules to provide the desired amperage output, the desired voltage output, and/or the desired power output for the external system 162. For example, a battery module 100 can be configured to nominally output 50.4 volts and can be combined with additional battery modules to provide power to 48 volt nodes, 100 volt nodes, 350-400 volt nodes, 700-750 volt nodes or any other volt nodes of the external system 162. Additionally, individual battery modules 100 can be configured to store 99 amp-hours, discharge up to 200 amps of electrical current, and receive up to 125 amps of current during charging. It should be noted that the above numbers are examples and that individual battery modules 100 can be configured to store an amount of amp-hours, discharge an electrical current, and receive an additional electrical current that is defined based at least on an application that the battery module 100 is intended for. Accordingly, the battery module 100 and the one or more battery cells 104 can be configured as a power source for the external system 162.

In some examples, the one or more battery cells 104 are electrically connected with the one or more busbars 144. The busbars 144 can be formed from a conductive material, such as a metal or a conductive polymer, that is coupled to and/or disposed is association with contacts of the one or more battery cells 104, wherein the contacts of the one or more battery cells 104 are conductive portions of the battery cells 104 that are connected to the internal material of the battery cells 104 and enable the chemical energy to electrical energy reaction that generates an electrical current within the internal circuit 140. As described above, the busbars 144 can receive electrical power from the one or more battery cells and provide the electrical power to the high voltage terminals 120, via the battery connectors 142 and the internal circuit 140. Additionally, the internal circuit 140 can be monitored by a current sensor, a voltage sensor, and/or other electrical sensors connected to the internal circuit 140 and configured to report a current, a voltage, an amperage, and/or other characteristics of the internal circuit 140. configured to measure current and/or voltage associated with the one or more battery cells 104. The current sensor, the voltage sensor, and/or other electrical sensors can be electrically connected to the high voltage terminals 120, the internal circuit 140, and/or other components of the battery module 100. Further the current sensor, the voltage sensor, and/or other electrical sensors can be configured to provide information (e.g., to provide signals including information) indicative of the measured current, voltage, and/or other operating parameters of the one or more battery cells 104 to the controller 124. Further, the internal circuit 140 includes a conductive material that is electrically connected to the busbars 144 via the battery connectors 142 and the high voltage terminals 120 via the battery connectors 142. Accordingly, the high voltage terminals 120 can provide contact points where an external portion of a high voltage circuit can be connected to the internal portion of the high voltage circuit and the external system associated with the battery module 100. The external system 162 can include other battery modules, machinery, systems, motors, and/or other components that receive power from the high voltage circuit.

The low voltage terminals 122 can be configured to provide contact points a low voltage control circuit that receives signals from the ECM of the external system 162. In particular, the low voltage terminals 122 can transmit signals and commands between the controller 124 and the ECM of the external system 162. The signals and commands can include activation commands for the heating system 158 and the cooling system 160, deactivation commands for the heating system 158 and the cooling system 160, power requests issued by the ECM, external system state indications, and other information that influences operation of the battery module 100. Accordingly, the controller 124 can be in communication with the ECM and the external system 162 via the low voltage terminals 122.

Additionally, one or more heating terminals can be mounted on a back plate (not illustrated) of the battery module 100. Alternatively, or in addition, the one or more heating terminals can be mounted on the front plate 118 in addition to the high voltage terminals 120 and the low voltage terminals 122. In particular, the heating terminals enable power to be provided to the heating pad 108 via the heating circuit 114 and cause the heating pad 108 to generate thermal energy that is provided to the one or more battery cells 104. It should be noted that while the heating terminals are illustrated as independent from the high voltage terminals 120, the heating terminals can be integrated into the high voltage terminal 120, wherein a connector to an external circuit can form an electrical connection with the internal circuit 140 and the heating circuit 114. Alternatively, or in addition, the heating circuit 114 can be electrically connected with the internal circuit 140 such that electrical power is provided to the heating circuit 114 via the internal circuit 140. Accordingly, the heating terminals can enable electrical power to be provided to the heating pad 108 and enable the provision of thermal energy to the one or more battery cells 104.

In some examples, the controller 124 can be associated with the battery module 100 and monitor the one or more battery cells 104. In particular, the controller 124 can be configured to communication with a thermocouple 156 that is installed in association with and/or is otherwise included in the internal circuit 140, and is configured to determine a battery temperature associated with the one or more battery cells 104. Additionally, the controller 124 can receive an indication of the battery temperature determined by the thermocouple 156 and determine whether the heating pad 108 or the cooling plate 110 is to be utilized to adjust the battery temperature of the one or more battery cells 104. It should be noted that the thermocouple 156 can be any temperature sensor that is configured to determine the battery temperature and generate the indication of the battery temperature (e.g., a thermocouple, a thermometer, an IR sensor, etc.). As will be described in greater detail by FIG. 7, the controller 124 can be configured to be in communication with an electronic control module (ECM) of the external system 162 that the battery module 100 is utilized by.

In some additional examples, the controller 124 can access and/or execute a thermal model that is configured to determine a thermal state of the one or more battery cells 104 based at least in part on the battery temperature determined by the thermocouple 156. More specifically, the thermal model can be configured to determine a temperature and/or thermal state of the battery module 100 based at least in part on the temperature detected at a position of the thermocouple 156. It should be noted that one or more additional thermocouples 156 (or other temperature sensors) can be included at one or more additional positions within the battery module 100 to improve the accuracy and/or precision of the thermal state determined by the controller 124. Additionally, the controller 124 can determine, based at least in part on the thermal model and the indication of the battery temperature received from the thermocouple 156, whether thermal energy is to be provided to the one or more battery cells 104 via the heating pad 108, or be extracted from the one or more battery cells 104 via the cooling plate 110. Accordingly, the controller 124 can be configured to receive information indicative of a battery temperature from the one or more thermocouples 156 described herein, determine the thermal state of the battery module 100 and/or the one or more battery cells 104, and determine whether the heating pad 108 and/or the cooling plate 110 is to be activated to modify the thermal state of the battery module 100 and/or the one or more battery cells 104.

For example, the controller 124 may receive the indication of the battery temperature generated by the thermocouple 156 and determine that the battery temperature associated with the battery module 100 and/or the one or more battery cells 104 exceeds a first temperature threshold. In particular, the controller 124 can determine that the cooling plate 110 is to be provided coolant based at least on the battery temperature exceeding the first temperature threshold. Additionally, the controller 124 can be configured to control the cooling system 160 to open a valve, activate a pump, and/or operate other internal components of the cooling system 160 to introduce coolant to the cooling plate 110 via the coolant connector 116. In some examples, the controller 124 can transmit an activation command causes a motor, an actuator, or other component of the cooling system 160 to provide coolant to the cooling plate 110. Alternatively, or in addition, the controller 124 can transmit a request to the cooling system 160 associated with the battery module that causes the cooling system 160 to provide coolant to the cooling plate 110 via the coolant connector 116. Accordingly, the cooling plate 110 can receive the coolant and distribute the coolant to extract thermal energy from the one or more battery cells 104 via the gap pad 106 and the heating pad 108.

In some additional examples, the controller 124 may receive the indication of the battery temperature generated by the thermocouple 156 and determine that the battery temperature associated with the battery module and/or the one or more battery cells 104 falls below a second temperature threshold. In particular, the controller 124 can determine that the heating pad 108 is to be provided power, via the heating circuit 114, that causes the heating pad 108 to generate thermal energy that is provided to the one or more battery cells 104. The controller 124 can be configured to activate a switch that completes a connection between the heating circuit 114 and a power source (e.g., the internal circuit 140, an external circuit that is connected to the heating circuit 114 via the heating terminals, etc.). Alternatively, or in addition, the controller 124 can be configured to transmit an additional command that causes a power source to provide power to the heating pad 108 via the heating circuit 114. Accordingly, the heating pad 108 can convert the power into thermal energy that is provided to the one or more battery cells 104 via the gap pad 106.

Accordingly, the heating pad 108 can be disposed adjacent to the gap pad 106 and/or the one or more battery cells 104 such that the heating pad 108 is able to provide thermal energy to the one or more battery cells 104 while reducing the amount of additional thermal energy that dissipated into and/or absorbed by materials between the heating pad 108 and the battery cells 104. Additionally, operation of the heating pad 108 can be associated with a start-up period for the external systems associated with the battery module 100 that has a first duration less than a second duration of an operating period of the external system where the cooling plate 110 provides cooling to the battery module 100. Due to the first duration being shorter than the second duration, minimizing the thermal energy sinks (e.g., material that will absorb and/or dissipate the thermal energy provided by the heating pad 108) can provide improved performance of the battery module 100. Further, by positioning the heating pad 108 immediately adjacent to the one or more battery cells 104, thermal energy is able to be provided to the battery cells 104 without heating the intervening material of the cooling plate 110. Reducing intervening material reduces the amount of material that is heated, reduces the amount of thermal energy utilized to heat the battery cells 104, and increases the efficiency of the heating by reducing the distribution of the thermal energy. Further, the proximity of the heating pad 108 to the battery cells 104 enables a shortened ramp up time for the thermal energy transfer to the battery cells 104 (e.g., heating pad 108 heats up the gap pad 106 made from a thermally conductive material such that the gap pad 106 transfers the thermal energy to the battery cells 104). Accordingly, placement of the heating pad 108 between the cooling plate 110 and the gap pad 106 enables a reduced start up time for operation of the battery module 100 and more efficient heating of the battery cells 104.

FIG. 2 is a cross-sectional view of the battery module 100 according to examples of the present disclosure. As noted with reference to FIG. 1, the battery module 100 can include a battery module housing 102 that includes a first end plate 130130 and a second end plate 132 that secure one or more battery cells 104. Additionally, a gap pad 106 can be connected to the one or more battery cells 104, a heating pad 108 can be adhered to and/or otherwise connected with the gap pad 106, and a cooling plate 110 can be affixed to the heating pad 108. The gap pad 106 is in physical contact with the one or more battery cells 104 at a bottom surface 146 of the one or more battery cells 104. It should be noted that the bottom surface 146 of the one or more battery cells 104 is comprised of the bottom surfaces of the one or more battery cells 104. Additionally, the cooling plate 110 can be comprised of a first cooling plate wall 204 of the cooling plate 110, a second cooling plate wall 206 of the cooling plate 110, and a coolant channel 208. Further, the cooling plate 110 can be associated with a first coolant connector 116 and a second coolant connector 210 that extend through openings in the front plate 118 of the battery module 100.

As noted above, the gap pad 106 comprises a malleable material that is configured to conform to the bottom surface 146 of the one or more battery cells 104. More specifically, the individual battery cells 104 can be comprised of a battery core that is encased in a battery cell case. The battery cell case can be assembled to envelope the battery core and to enable the redox reaction and/or other chemical energy to electrical energy conversion via one or more battery cell contacts. However, as a side-effect of assembly, individual battery cells 104 have battery cell heights that include minor variations. Further, during assembly of the battery module 100, the battery cells are compressed, altering the battery cell heights further and causing additional variations in the battery cell heights. Accordingly, the gap pad 106 can be pressed against the bottom surface 146 of the one or more battery cells 104 to deform the gap pad 106 such that the gap pad 106 conforms to the bottom surface 146. Additionally, the gap pad 106 can be configured to serve as a thermal interface and a physical interface that transfers thermal energy between the thermally active components of the battery module 100 (e.g., the heating pad 108 and the cooling plate 110) and the one or more battery cells 104. In particular, the gap pad 106 conforms to the bottom surface 146 of the battery cells 104 to provide the heating pad 108 and the cooling plate 110 a substantially flat surface to be coupled to. Accordingly, the gap pad 106 can be configured to provide substantially continuous thermal communication between the one or more battery cells 104, the heating pad 108, and the cooling plate 110.

In some examples, the cooling plate 110 can be comprised of individual walls that are configured direct the coolant received via the first coolant connector 116, in proximity to the one or more battery cells 104 and the gap pad 106, to the second coolant connector 210. More specifically, the cooling plate 110 can include the first cooling plate wall 204 and the second cooling plate wall 206 that are formed to create the coolant channel 208. Additionally, the first cooling plate wall 204 can be a substantially flat wall that is configured to contact the heating pad 108 and a lower surface of the gap pad 106. Further, the cooling plate 110 can be attached to, adhered to, coupled to, and/or otherwise joined with the gap pad 106, the heating pad 108, and/or the battery module housing 102 individually and/or in combination with the slide plate 112. Accordingly, the first cooling plate wall 204 can be secure in contact with the gap pad 106 and the heating pad 108, providing thermal conductance between the one or more battery cells 104 and the cooling plate 110.

Additionally, the cooling plate 110 can include the second cooling plate wall 206 that is configured to form the coolant channel 208. In particular, the second cooling plate wall 206 can be formed, molded, cast, stamped and/or otherwise formed to include contours of the coolant channel 208. More specifically, the second cooling plate wall 206 can include formed portions 212 that extend downward on at least the Z-axis. Additionally, the cooling plate 110 can be formed from combining the first cooling plate wall 204 and the second cooling plate wall 206. Due to the formed portions 212 of the second cooling plate wall 206, the second cooling plate wall 206 can include a first plane 214 that is configured to combine with the first cooling plate wall 204 and a second plane 216 that is configured to define the coolant channel 208. Accordingly, the first plane 214 of the second cooling plate wall 206 can be a substantially planar portion of the second cooling plate wall 206 that is configured to be welded, secured, braised, or otherwise combined with the first cooling plate wall 204 to form a substantially fluid tight seal 218 between the first cooling plate wall 204 and the second cooling plate wall 206. The substantially fluid tight seal 218 can be formed via an O-ring, a combined portion of the first cooling plate wall 204 and the second cooling plate wall 206, or other sealant. Further, the second plane 216 of the second cooling plate wall 206 can be a substantially planar portion of the second cooling plate wall 206 that is disposed a distance D from the first cooling plate wall 204 to form the coolant channel 208.

Further, the cooling plate 110 can include a coolant channel 208 that is configured to contain coolant received via the first coolant connector 116, direct the coolant in proximity to the first cooling plate wall 204, and direct the coolant to the second coolant connector 210. As noted above, the coolant channel 208 can be defined by the first cooling plate wall 204 and the second cooling plate wall 206. Additionally, the coolant channel 208 can include a single continuous path that extends from the first coolant connector 116 to the second coolant connector 210 in proximity to substantially all of the one or more battery cells 104. Alternatively, or in addition, the coolant channel 208 can include individual coolant paths that are associated with groups of the one or more battery cells 104. The individual coolant paths can be configured to split off from a portion of the coolant channel 208 that receives coolant from the first coolant connector 116 and direct a portion of the coolant in proximity to an associated group of the one or more battery cells 104 to the output connector (second cooling connector 210). Accordingly, the coolant channel can be configured to provide cooling for the one or more battery cells 104 via the coolant that is directed through an associated portion of the cooling plate 110.

In some examples, the coolant channel 208 can be configured to provide substantially equal amounts of cooling to the one or more battery cells 104 to maintain thermal equilibrium within the battery module 100. In particular, the coolant channel 208 can be configured distribute coolant to portions of the coolant channel 208 that are associated with individual battery cells 104 such that the individual battery cells 104 receive similar amounts of cooling. More specifically, the individual battery cells 104 generate thermal energy (e.g., heat) during power generation (providing that the redox reaction or other reaction is not endothermic). Accordingly, the coolant channel 208 can be configured to receive an amount of coolant at a flow rate that is sufficient to remove the thermal energy generated by the one or more battery cells 104 during a period of time. Additionally, the coolant channel 208 can be configured to distribute the coolant to portions of the coolant channel 208 that are associated with the individual battery cells 104 to remove the thermal energy generated by each of the battery cells 104. It should be noted that while a temperature of the coolant will rise while the coolant traverses the coolant channel 208 (reducing the rate at which thermal energy is transferred to the coolant) from the first coolant connector 116 to the second coolant connector 210, the dimensions of the coolant channel can vary to enable approximately equivalent cooling to be provided to each of the battery cells 104. For example, the coolant channel 208 can initially have a first cross-sectional area (e.g., wherein the distance D is a first distance D1 between the first cooling plate wall 204 and the second cooling plate wall 206) that causes a first flow rate of coolant through a first portion of the coolant channel 208. Additionally, the coolant channel 208 can include a second portion that is associated with a second cross-sectional area (e.g., wherein the distance D is a second distance D2 between the first cooling plate wall 204 and the second cooling plate wall 206) that causes a second flow rate of coolant through the second portion of the coolant channel 208. Accordingly, the first cross-sectional area can be less than the second cross-sectional area and cause the first flow rate to be greater than the second flow rate. Further, the first flow rate of coolant can be configured to limit the amount of thermal energy extracted from a first group of battery cells 104, wherein the second flow rate of coolant can be configured to provide additional exposure of the coolant to a second group of battery cells 104 such that a substantially equivalent amount of thermal energy is extracted from the first group of battery cells 104 and the second group of battery cells 104. Alternatively, or in addition, the coolant channel 208 can be configured to substantially balance the thermal energy extracted from individual battery cells 104 via positioning of the coolant channel 208 relative to the one or more battery cells 104 (e.g., battery cells 104 that are associated with an upstream portion of the coolant channel 208 can be associated a downstream portion of the coolant channel 208 while battery cells 104 that are associated with a midstream portion of the coolant channel 208 can be associated with a length of the midstream portion of the coolant channel approximately equal to the upstream portion and the downstream portion), splitting of the coolant channel (e.g., splitting the coolant channel such that coolant is distributed to reduce the number of battery cells 104 that are associated with a portion of the coolant channel), and other distribution methods of the coolant.

Accordingly, placement of the cooling plate 110 outward from the heating pad 108 enables an increase in heating efficiency from the heating pad 108 with minimal impact on the cooling plate 110. More specifically, the cooling plate 110 can be a metallic structure comprised of the first cooling plate wall 204, the second cooling plate wall 206, and the coolant channel 208 (optionally including residual coolant within the coolant channel 208) that can operate as a heat sink if disposed between the heating pad 108 and the gap pad 106. In contrast, the heating pad 108 can be a conductive material that represents a smaller thermal sink than the structure of the cooling plate 110. Accordingly, placement of the heating pad 108 between the cooling plate 110 and the gap pad 106 increases the efficiency of heating the battery cells 104 with minimal impact of the cooling of the battery cells 104 via the cooling plate 110 due to the thermal characteristics of the heating pad 108 (e.g., relatively low mass, thermally conductive, low heat capacity, etc.) compared to the thermal characteristics of the cooling plate 110 (e.g., thicker structure, heavier structure, greater heat capacity due to mass and residual coolant, etc.).

FIG. 3 is a cross-sectional view of the cooling plate 110 and the first coolant connector 116 associated with the battery module 100 according to examples of the present disclosure. As noted with reference to FIG. 1 and FIG. 2, the battery module 100 can include a battery module housing 102 that secures one or more battery cells 104 in association with a gap pad 106, a heating pad 108, a cooling plate 110, and a slide plate 112. Additionally, the battery module housing 102 can be configured to join with a front plate 118 of the battery module 100 that a coolant connector 116 extends through. Further, the cooling plate 110 can be comprised of a first cooling plate wall 204, a second cooling plate wall 206, and a coolant channel 208. The cooling plate 110 can be associated with a coolant channel opening 302 that is coupled to a coolant channel nozzle 304 that forms a substantially fluid tight seal 308 with a coolant connector wall 306. Accordingly, the coolant connector 116 can receive a flow of coolant 310 and direct the flow of coolant 310 through the coolant channel nozzle 304 and into the coolant channel 208.

In some examples, the coolant channel opening 302 can be disposed on the first cooling plate wall 204 such that the coolant connector 116 passes through an opening in the front plate 118 of the battery module 100. The coolant channel opening 302 can be a port that traverses the first cooling plate wall 204 and permits a fluid connection to be formed with the coolant channel 208. For example, the coolant channel nozzle 304 can be inserted into the coolant channel opening 302 such that the first coolant connector 116 can be secured to the cooling plate 110. In particular, a first portion of the coolant channel nozzle 304 is coupled to the cooling plate 110 at the coolant channel opening 302 and the first coolant connector 116 is coupled to a second portion of the coolant channel nozzle 304. Additionally, the coolant channel nozzle 304 can form a first substantially fluid tight seal 308a with the coolant channel opening 302 such that the coolant channel 208 is exposed to fluid connections via the coolant channel nozzle. Further, the coolant channel nozzle 304 can form a second substantially fluid tight seal 308b with an interior portion of the coolant connector wall 306 of the first coolant connector 116. The first substantially fluid tight seal 308a can be formed through welding, mechanical fastening, brazing, and/or other couplings between the first cooling plate wall 204 and the coolant channel nozzle 304. The second substantially fluid tight seal 308b can be formed via an O-ring or other sealing surface that substantially prevents fluid passing between the coolant channel nozzle 304 and the coolant connector wall 306.

In some examples, the coolant connector 116 can include the coolant connector wall 306 that is configured to direct the flow of coolant 310 into the coolant channel 208. The coolant connector wall 306 can include a flared portion 312 that can be utilized to secure a fluid channel from a coolant source. The fluid channel can be in fluid communication with the cooling plate 110 via the coolant connector 116. For example, a quick-disconnect nozzle can be attached to the coolant connector 116 via the flared portion 312 of the coolant connector wall 306 and form a substantially fluid tight seal with the coolant connector wall 306 such that the flow of coolant 310 is output by the coolant source and provided to the cooling plate 110.

Additionally, it should be noted that the cooling plate 110 and the coolant channel 208 can be configured to support bidirectional coolant flow and unidirectional coolant flow. In particular, the flow of coolant 310 can be configured to enter the coolant connector 116 from the cooling system 160 or to exit the coolant connector 116 to the cooling system 160. Further, the coolant channel 208 can be configured to distribute the flow of coolant 310 independent of flow direction such that, regardless of whether the flow of coolant 310 enters the coolant connector 116 and/or exits the coolant connector 116, coolant is distributed in proximity to the plurality of battery cells 104. Accordingly, the first coolant connector 116 can be configured as a coolant inlet or a coolant outlet depending on the flow of coolant 310 from the cooling system 160.

In some examples, the coolant connector 116 can include an external fluid seal 314. In particular, the external fluid seal 314 can form a substantially fluid tight seal between the coolant connector wall 306 and the front plate 118 of the battery module 100. In particular, the external fluid seal 314 can fluidly seal the passthrough of the coolant connector 116 in the front plate 118 to substantially prevent fluids from entering the battery module 100 via the passthrough. Additionally, the external fluid seal 314 can be configured such that when the front plate 118 is installed on the battery module housing 102, the external fluid seal 314 substantially prevents fluids from passing through the opening in the front plate 118, that the coolant connector 116 extends through, and into the battery module 100. Further, the second coolant connector 210 can be associated with a similar fluid seal such that fluid is prevented from entering the battery module 100 via the openings in the front plate 118 that the coolant connectors extend through.

Figure 4:
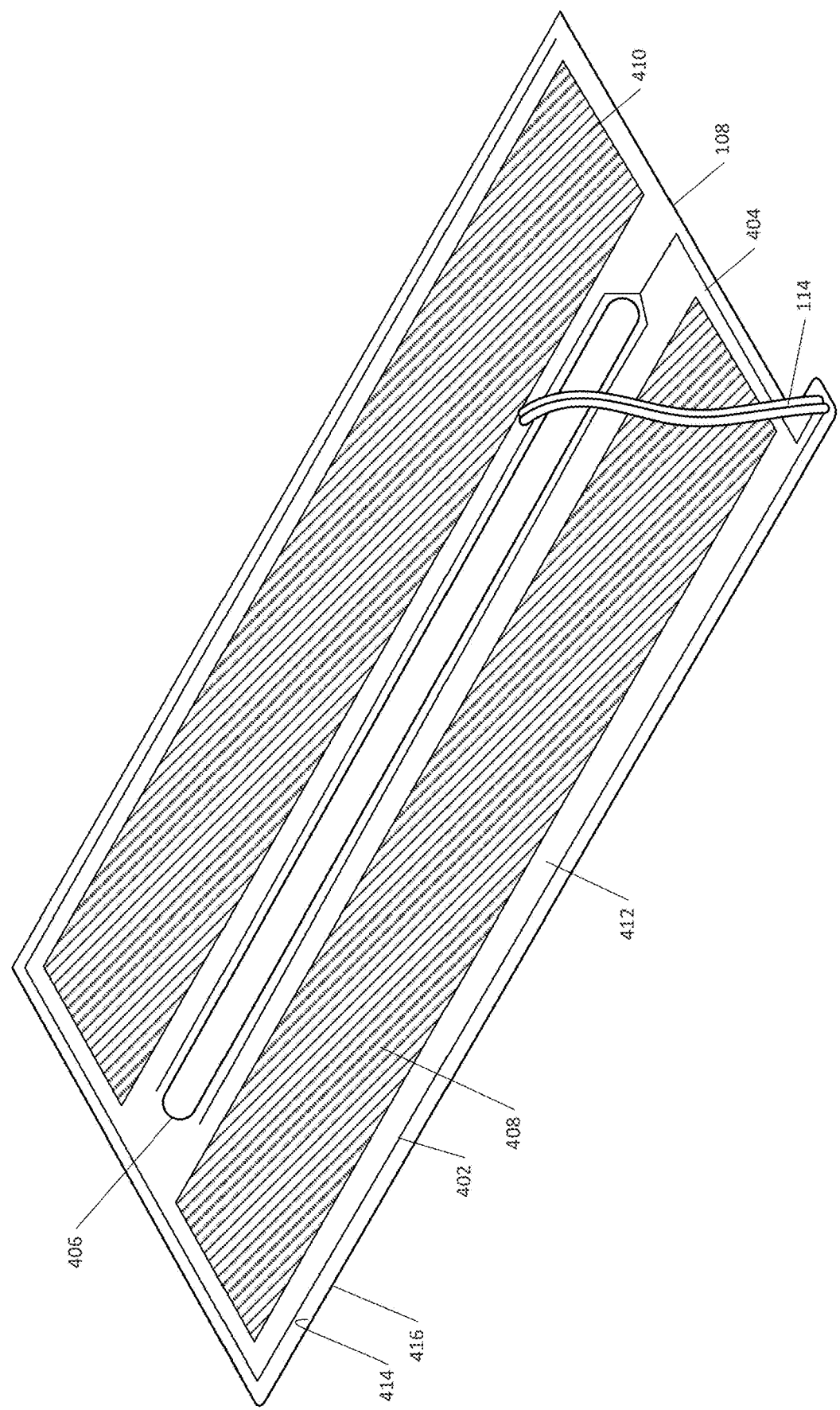
FIG. 4 illustrates a component-specific view of the heating pad and the components of the heating pad according to examples of the present disclosure.

FIG. 4 is a component-specific view of the heating pad according to examples of the present disclosure. As noted with reference to FIG. 1 and FIG. 2, the battery module 100 can include a heating pad 108 that is configured to provide thermal energy to one or more battery cells 104 via a gap pad 106. Additionally, the battery module 100 can include a heating circuit 114 that is configured to provide power to the heating pad 108. The heating pad 108 can be comprised of a first heating lead 402, a second heating lead 404, a central slot 406, a first heating element 408, and a second heating element 410. Further, the first heating lead 402 and the second heating lead 404 can be electrically coupled to the heating circuit 114 and configured to provide power to the first heating element 408 and the second heating element 410.

In some examples, the heating pad 108 can include a heating pad substrate 412 as described above with respect to FIG. 1. As noted above, the heating pad substrate 412 can be formed from various materials including polymers, ceramics, conductive plastics, epoxies, metallic substances, and other conductive materials. Additionally, the heating pad substrate 412 includes a first surface 414 and a second surface 416, wherein the first surface 414 is disposed in proximity to the gap pad 106 and the second surface 416 is disposed in proximity to the cooling plate 110. Further, components of the heating pad 108 can be affixed to the first surface 414 such that assembly of the battery module 100 causes the components to be in proximity to the gap pad 106 and the one or more battery cells 104. More specifically, the first heating lead 402, the second heating lead 404, the first heating element 408, and/or the second heating element 410 can be printed onto, embedded into, adhered onto, and/or otherwise affixed to the first surface 414. Accordingly, the first surface 414 and the first heating lead 402, the second heating lead 404, the first heating element 408, and/or the second heating element 410 can be substantially adjacent to a bottom surface of the gap pad 106 after construction of the battery module 100.

In some examples, the first heating lead 402 and the second heating lead 404 are circuit leads that extend from the heating circuit 114 and provide power to the first heating element 408 and the second heating element 410. In particular, the heating circuit 114 can be electrically connected to the heating system 158, wherein the heating system 158 is configured to provide power to the heating pad 108. The heating system 158 can be at least partially controlled by the controller 124 and/or can be associated with a circuit switch that is controlled by the controller 124. Additionally, the first heating lead 402 and the second heating lead 404 can be electrically coupled to the heating circuit 114 to form an electrical circuit that provides power to the first heating element 408 and the second heating element 410. Further first heating lead 402 and the second heating lead 404 can be electrically connected to each other via the first heating element 408 and the second heating element 410, completing the electrical circuit. Accordingly, the first heating lead 402 and the second heating lead 404 can be electrical sources that enable the production of thermal energy for the one or more battery cells 104 by the first heating element 408 and the second heating element 410.

In some examples, the first heating element 408 and the second heating element 410 are sources of thermal energy for the one or more battery cells 104. In particular, the first heating element 408 and the second heating element 410 can be configured to convert electrical energy into thermal energy that is provided to the one or more battery cells 104 via the gap pad 106. More specifically, the first heating element 408 and/or the second heating element 410 can be resistive heating elements that are configured to receive power from the first heating lead 402 and the second heating lead 404 electricity to generate thermal energy that increases a battery temperature associated with the one or more battery cells 104. Additionally, the first heating element 408 and/or the second heating element 410 can be metallic resistance heating elements, ceramic heating elements, semiconductor heating elements, thick film heating elements, polymeric heating elements, and/or other components configured to generate thermal energy. For example, the first heating element 408 and the second heating element 410 can be positive temperature coefficient (PTC) heating elements that are printed onto the first surface 414 of the heating pad 108. A PTC heating element can comprise a conductive rubber and/or polymer that is printed onto the heating pad substrate 412, wherein the conductive rubber and/or conductive polymer is associated with a positive thermal coefficient that causes the resistivity of the PTC heating element to increase as the temperature of the heating pad 108 increases. Accordingly, the PTC heating element can self-regulate such that as the battery temperature associated with the one or more battery cells 104 increase (e.g., causing a heating element temperature to increase), the PTC heating element (e.g., the first heating element 408 and/or the second heating element 410) becomes increasingly resistive to electrical currents until a switching temperature where the PTC heating element substantially prevents electrical current between the first heating lead 402 and the second heating lead 404 and substantially ceases producing thermal energy.

In some additional examples, the first heating element 408 and the second heating element 410 can be associated with a first battery cell stack that includes a first set of the one or more battery cells 104 and a second battery cell stack that includes a second set of the one or more battery cells 104. In particular, the first heating element 408 and the second heating element 410 can be configured to provide substantially equivalent heating for the first battery cell stack and the second battery cell stack. More specifically, the first heating element 408 and the second heating element 410 can be electrically connected in parallel via the first heating lead 402 and the second heating lead 404. Alternatively, or in addition, the first heating element 408 and the second heating element 410 can be configured such that the first heating element 408 achieves a first temperature for the first battery cell stack 136 and the second heating element 410 achieves a second temperature the second battery cell stack 138. It should be noted that the first heating lead 402 and the second heating lead 404 may include a first internal circuit associated with the first heating element 408 and a second internal circuit associated with the second heating element 410 such that the first internal circuit is utilized to modulate the first amount of heating provided by the first heating element 408 and the second internal circuit is utilized to modulate the second amount of heating provided by the second heating element 410. Further, the controller 124 can be configured to adjust the first amount of heating and the second amount of heating via modulation of the power provided to the first heating element 408 and the second heating element 410. Accordingly, the first battery cell stack can be heated by providing power to the first heating element 408 and the second battery cell stack can be heated by providing power to the second heating element 410.

The first heating element 408 and the second heating element 410 can be separated by a central slot 406 that is disposed between the first heating element 408 and the second heating element 410 within the heating pad substrate 412. In particular, the central slot 406 can permit the central wall 134 to extend between the first battery cell stack and the second battery cell stack through the gap pad 106, the heating pad 108, and/or the cooling plate 110. The central wall 134 can be configured to provide structural support for the battery module 100 and can be configured to divide the first battery cell stack from the second battery cell stack. Additionally, the central wall can be configured as a thermal insulator to at least partially isolate the first battery cell stack from the second battery cell stack, or a thermal conductor that distributes thermal energy between the first battery cell stack and the second battery cell stack.

Figure 5:
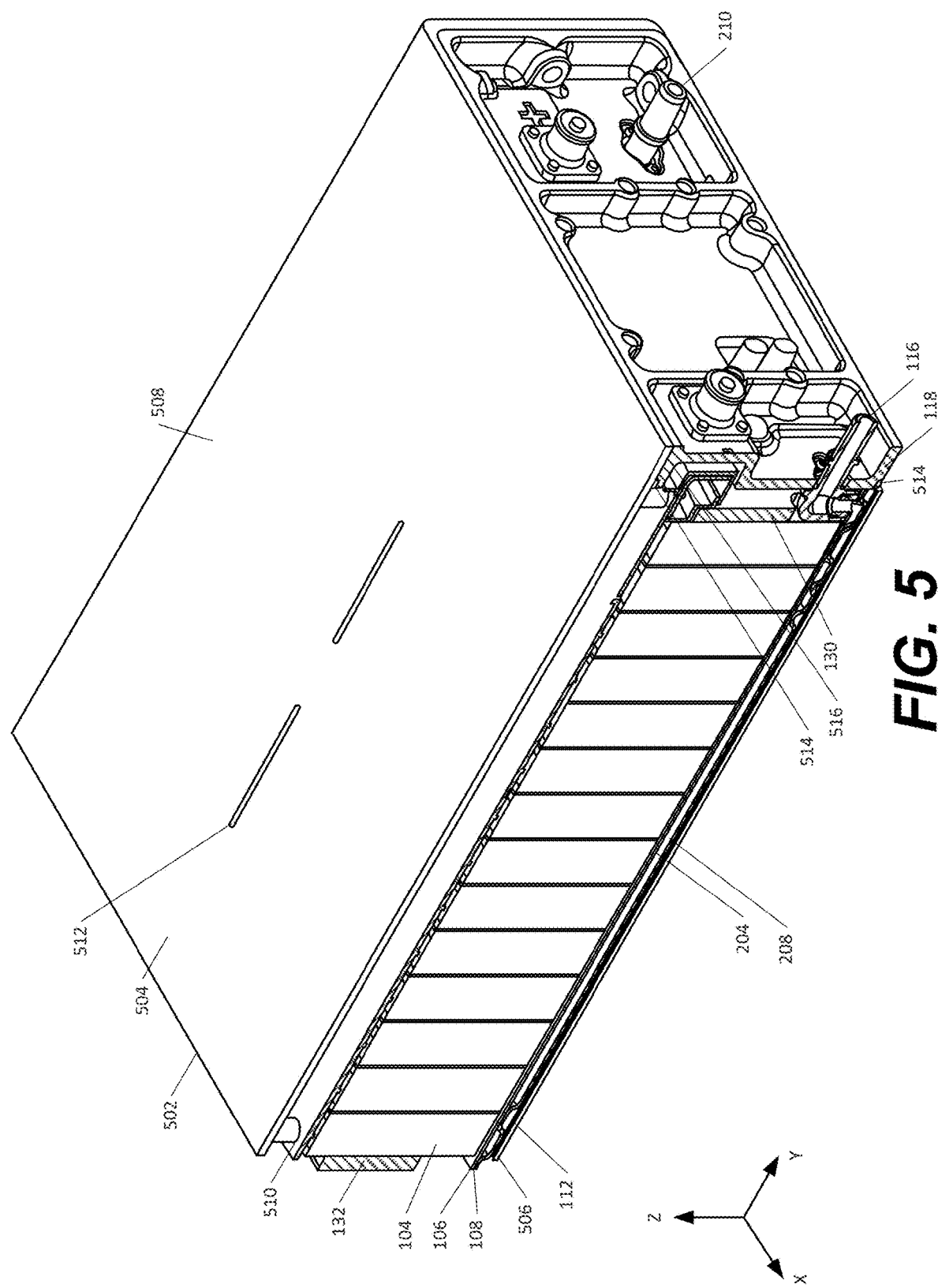
FIG. 5 illustrates the exemplary battery module installed within an exterior housing of the battery module according to examples of the present disclosure.

FIG. 5 is a cross-sectional view of the battery module 100, the cooling plate 110, and the first coolant connector 116 according to examples of the present disclosure. As noted with reference to FIG. 1, FIG. 2, and FIG. 3, the battery module 100 can include a battery module housing 102 that secures one or more battery cells 104 in association with a gap pad 106, a heating pad 108, a cooling plate 110, and a slide plate 112. Additionally, the battery module housing 102 can be installed in an exterior housing 502. Further, the battery module 100 can be installed in an exterior housing 502. In particular, a top wall 504 of the exterior housing 502 is spaced from a top surface of the battery module 100, the slide plate 112 is adjacent to an exterior housing bottom wall 506, and one or more exterior housing walls 508 are disposed adjacent to the first side wall 126 and/or the second side wall 128 of the battery module housing 102.

In some examples, the exterior housing 502 is shaped to correspond with an exterior perimeter of the battery module housing 102 such that the exterior housing 502 substantially covers the battery module 100 and the one or more battery cells 104 when the battery module is installed within the exterior housing 502. The exterior perimeter of the battery module housing 102 is defined by the dimensions of the first side wall 126, the second side wall 128, the first end plate 130, and the second end plate 132. Additionally, the exterior housing 502 may be made from a non-conductive material such as ceramic, plastic, rubber, polymer, or any other suitable non-conductive material. Additionally, the central wall 134 of the battery module housing 102 includes can include tabs that extend from a top portion of the central wall 134. The exterior housing 502 includes apertures 512 therein and the tabs are configured to correspond with the apertures 512 in the exterior housing 502 such that the tabs extend at least partially above the exterior housing top wall 504. As such, the tabs prevent and/or reduce deformation of the exterior housing 502 if the exterior housing 502 is subject to downward forces. The exterior housing 502 and the tabs may substantially prevent the battery module 100 from shorting or from other types of damage due to crushing.

In some additional examples, the exterior housing bottom wall 506 can be configured such that the slide plate 112 enables the battery module 100 to be installed within the exterior housing. In particular, the exterior housing bottom wall 506 can be a substantially planar surface such that the slide plate 112 enables the battery module 100 to slide along the exterior housing bottom wall 506 and into an installed position (e.g., slide in a direction along the Y-axis of FIG. 5). Alternatively, or in addition, the exterior housing bottom wall 506 can include ridges and/or channels that direct the battery module 100 into the exterior housing 502 and substantially prevent movement in along the X-axis of FIG. 5.

In some further examples, the exterior housing top wall 504 and/or the one or more exterior housing walls 508 can be configured such that the battery module 100 is secured within the exterior housing 502 after the battery module 100 has been installed. More specifically, the exterior housing 502 is constructed to receive the battery module 100, secure the battery module 100 within the exterior housing 502, and substantially prevent the battery module 100 from being damaged during normal operation. The exterior housing top wall 504 and/or the one or more exterior housing walls 508 can be configured such that installation of the battery module 100 within the exterior housing 502 causes the exterior housing top wall 504 to be substantially adjacent to a top surface of the one or more battery cells and the one or more exterior housing walls 508 to be substantially adjacent to the first side wall 126, the second side wall 128, and/or the second end plate 132 of the battery module housing 102. Alternatively, the exterior housing top wall 504 and/or the one or more exterior housing walls 508 can be associated with one or more spaces 510 that are configured to secure the battery module 100 within the exterior housing 502. Accordingly, the battery module 100 can be installed within the exterior housing 502 and secured to substantially prevent movement of the battery module 100 within the exterior housing 502.

In some examples, the exterior housing 502 can be fluidly sealed to the battery module 100 via a seal 514. In particular, the seal 514 can be disposed between an outer surface 516 of the front plate 118 and the exterior housing 502. More specifically, the seal 514 can extend around the perimeter of the outer surface 516 and form a substantially continuous fluid-tight seal between the outer surface 516 and the exterior housing 502 such that when the battery module 100 is installed within the exterior housing, the seal 514 prevents fluid from passing between the exterior housing 502 and the front plate 118 to enter the battery module 100. Similarly, an additional seal (not illustrated) can extend between a back plate of the battery module and substantially prevent fluid from passing between the exterior housing 502. Accordingly, the exterior housing 502, the front plate 118, and the back plate can be fluidly sealed by the seal 514 to substantially isolate the internal volume of the exterior housing 502 from liquids such that the battery module is able to remain sealed and operational in wet and/or aqueous environment (e.g., the battery module 100 remains operational even if the exterior housing 502 is submerged in water).

Additionally, the high voltage terminals 120, the low voltage terminals 122, the first coolant connector 116, the second coolant connector 210, and the heating terminals can be substantially fluidly sealed to further prevent fluids from entering the exterior housing 502 via the various terminals. More specifically, the high voltage terminals 120, the low voltage terminals 122, the first coolant connector 116, the second coolant connector 210, and the heating terminals can be configured to include an external fluid seal or an internal fluid seal. For example, the first coolant connector 116 is associated with the external fluid seal 314 that seals the opening that the first coolant connector 116 extends through. Further, the high voltage terminals 120 can be configured such that the high voltage terminals 120, when mounted on the front plate and in electrical communication with the plurality of battery cells 104, form substantially fluid tight seals with the front plate 118. Alternatively, or in addition, the high voltage terminals 120 can be configured to form substantially fluid tight seals with a high voltage coupling associated with the external system 162. Accordingly, when the battery module 100 is assembled and installed in the exterior housing 502 and/or when the various terminals are connected to the associated couplings, the exterior housing 502, the front plate 118, and the back plate are fluidly sealed to substantially prevent fluid from entering the battery module 100. For example, the battery module 100 and the exterior housing 502 can be fluidly sealed such that the battery module 100 is not penetrated by fluid while submerged in water (e.g., the battery module continues to function while submerged in at least one meter of water for thirty minutes) and operating.

Accordingly, the seal 514 can be a gasket, o-ring, or other sealing component that is disposed between the exterior housing 502 and the front plate 118 (or an analogous position on the back plate) to form a substantially fluid tight seal. In particular, the front plate 118 (and the back plate) can include a channel that the fluid tight seal 514 is placed within and that presses the fluid tight seal 514 against an inner surface of the exterior housing 502 to prevent fluids from entering the exterior housing 502. The fluid tight seal 514 can be a molded, injection molded, extruded, or otherwise formed gasket that is installed on the front plate 118 (or the back plate) before installation of the battery module 100 within the exterior housing 502.

Figure 6:
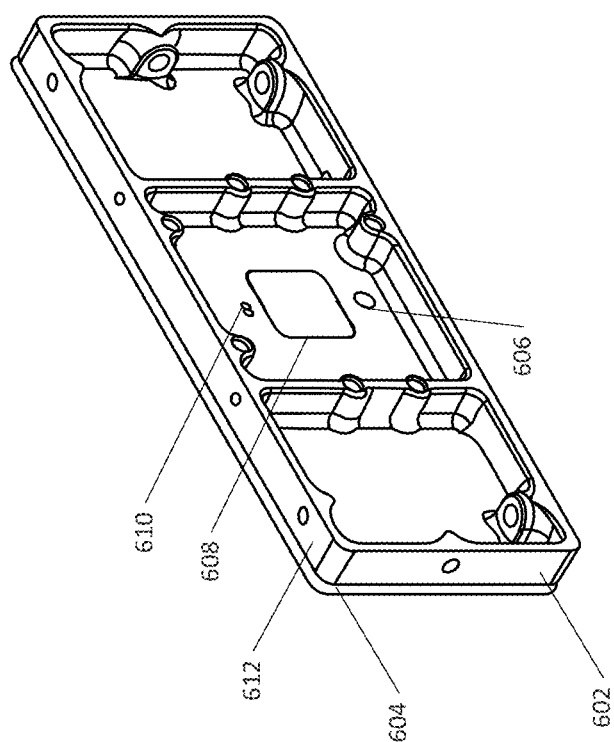
FIG. 6 illustrates a back plate of the exemplary battery module that is installed within an exterior housing of the battery module according to examples of the present disclosure.

FIG. 6 illustrates a back plate 602 of the exemplary battery module 100. In particular, and as noted above, the back plate 602 can include a seal 604 that is configured to form a substantially fluid-tight seal between the back plate 602 and the exterior housing 502 to substantially prevent fluid from entering the exterior housing. Additionally, the back plate 602 can include a pressure release 606, a failure panel 608, and the heating terminals 610 that are associated with the heating pad 108. Further, the back plate 602 can be mounted on the second end plate 132 of the battery module housing 102.

In some examples, the back plate 602 can be substantially similar to the front plate 118 in dimensions, fabrication, and constructions. In particular, a back plate height can be substantially equivalent to the front plate height, a back plate width can be substantially equivalent to the front plate width, and a black plate thickness can be substantially similar to the front plate thickness. Additionally, the back plate 602 can be configured to fit within the exterior housing 502 similar to the front plate 118. Accordingly, the back plate 602 can be configured similar to the front plate 118 and can be configured to substantially align with and/or fit within the exterior housing 502 upon assembly and/or construction of the battery module 100, wherein the battery module 100 is inserted into the exterior housing 502 and the back plate 602 is exposed on the second end of the exterior housing 502.

In some examples, and similar to the seal 514, the seal 604 can be configured to fluidly seal the battery module 100 and the exterior housing 502. In particular, the seal 604 can be disposed between an outer surface 612 of the back plate 602 and the exterior housing 502. More specifically, the seal 604 can extend around the perimeter of the outer surface 612 and form a substantially continuous fluid tight seal between the outer surface 612 and the exterior housing 502 such that when the battery module 100 is installed within the exterior housing 502 fluid is substantially prevented from passing between the exterior housing 502 and the back plate 602 to enter the battery module 100. Accordingly, the exterior housing 502, the front plate 118, and the back plate 602 can be configured to seal the internal volume of the exterior housing 502 such that the battery module 100 is able to remain sealed and operational in wet and/or aqueous environments (e.g., the battery module 100 remains operational even if the exterior housing 502 is submerged in water).

Alternatively, the front plate 118 and the back plate 602 can be configured to form a substantially fluid tight seal with the exterior housing without the utilization of a gasket and/or other component that is installed between the outer surface 516 or the outer surface 612 and the exterior housing 502. For example, the exterior housing can be fused with the front plate 118 and/or the back plate 602 to form the substantially fluid tight seal. Accordingly, and independent of configuration, the exterior housing 502, the front plate 118, and the back plate 602 form a substantially fluid tight internal volume of the external housing that include the battery module 100. Further, the various terminals and connectors can be similarly configured to form fluid tight seals to maintain the fluid tight internal volumes in the unconnected (e.g., no couplings attached) and/or connected (e.g., couplings attached) state.

In some examples, the back plate 602 can include a pressure release 606 that is configured to enable pressure equalization between the interior volume of the external housing and the surrounding environment. In particular, the pressure release 606 can be configured to be permeable to gases but impermeable to liquids such as water. Additionally, the pressure release 606 can be a bidirectional pressure release that enables a high internal pressure of the exterior housing to be vented to atmosphere and for a low internal pressure of the exterior housing to be relieved by the atmosphere. The pressure release 606 can be a polymeric material, plastic material, polytetrafluoroethylene, or similar material that enables gases to be transferred without transferring liquids. For example, if a change in altitude results in a pressure differential across the pressure release 606, the pressure release can be configured to cause the internal pressure to equilibrate with the surrounding environment. The pressure differential can enable gases to be driven through a membrane and reach equilibrium between the internal pressure and the surrounding environment. Further, the pressure release 606 can be configured to automatically transfer gases between the interior volume of the exterior housing 502 and the surround environment or to transfer gases based on a command signal from the controller 124. Accordingly, the pressure release 606 can be configured to maintain equilibrium within the exterior housing 502.

In some examples, the failure panel 608 can be configured to prevent unnecessary damage or injury from being inflicted by the battery module 100 in the case of a catastrophic failure. In particular, the failure panel 608 can be configured to vent the internal pressure of the exterior housing 502 in the case of a battery cell failure event that causes one or more battery cells 104 to vent into the internal volume of the exterior housing. As a result of the rapidly rising internal pressure (in excess of what the pressure release 606 can relieve) the failure panel 608 can rupture and enable the exterior housing to depressurize, preventing a rupture or failure of the exterior housing 502, the front plate 118, and/or the back plate 602 that carries the risk of injury or significant damage. The failure panel 608 can be configured to permit rupture at pressures in excess of a pressure threshold, generally much higher than atmospheric pressures, that prevent the exterior housing failing with explosive decompression.

In some examples, the heating terminals 610 can be configured similar to the high voltage terminals 120 and the low voltage terminals 122. In particular, a power source of the heating system 158 can connect to the heating pad 108 via the heating terminals 610. Additionally, the heating terminals 610 can be substantially fluid tight, preventing fluid from entering the exterior housing via the heating terminals 610. Accordingly, the heating terminals 610 provide electrical communication between the power source and the heating pad 108 without enabling fluid communication between the exterior environment and the internal volume of the exterior housing 502.

Accordingly, the exterior housing 502 can be sealed against fluids permeating the exterior housing 502 and entering the battery module 100, damaging the battery module 100 and preventing operation of the battery module 100. Additionally, by configuring individual battery modules as isolated and sealed components that can be combined to satisfy power demands of the external system 162, operation of the external system and the battery modules 100 can be maintained even if a single battery module fails or is to be deactivated. Further, the independent configuration of the battery modules 100 enables superior scalability of solutions utilizing the battery modules 100.

Figure 7:
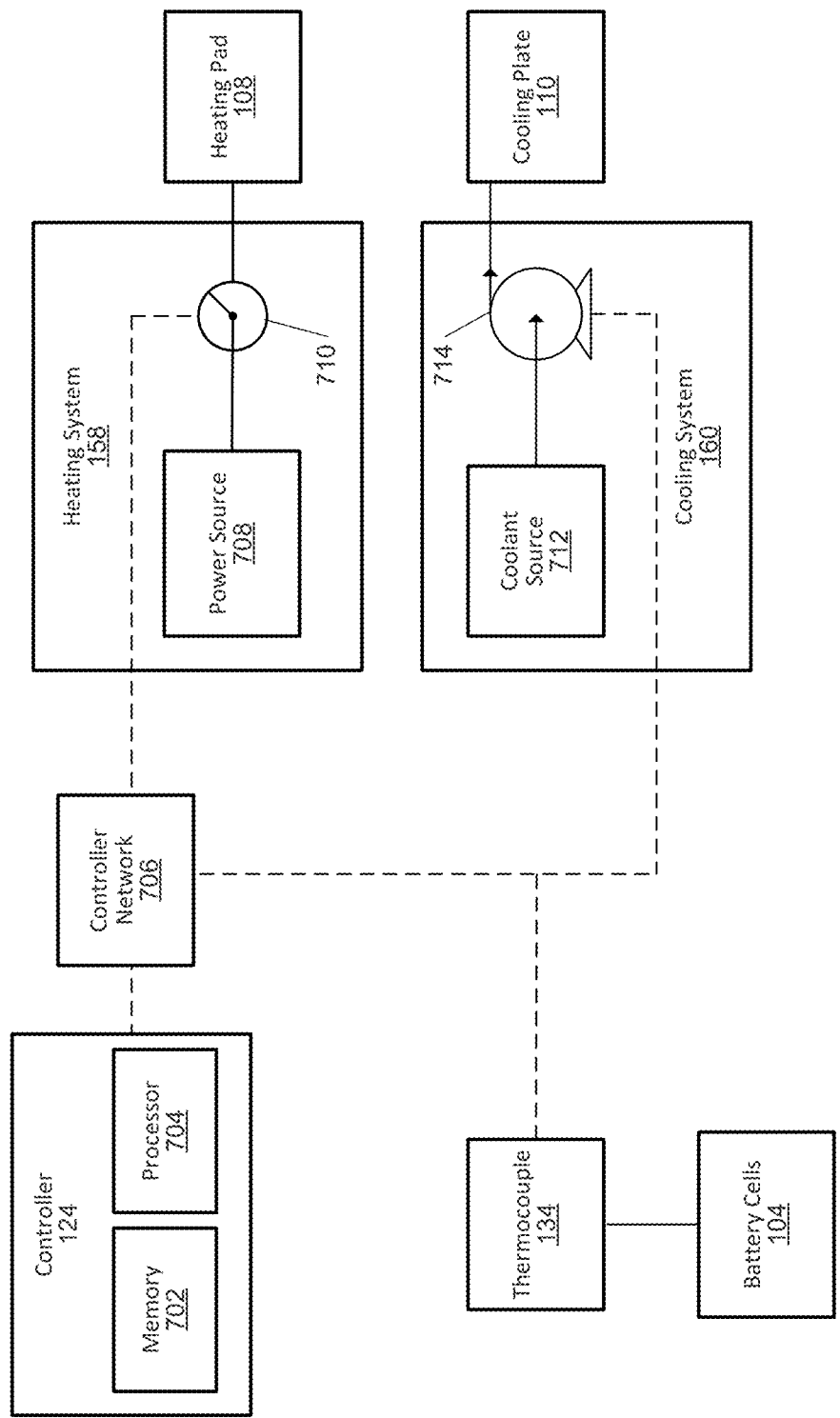
FIG. 7 illustrates a block diagram of a controller associated with the battery module that controls the heating pad and the cooling plate accordingly to examples of the present disclosure.

FIG. 7 is a block diagram of the controller 124 associated with the battery module 100. As described above, the controller 124 is configured to control operations of the heating pad 108 and the cooling plate 110 in response to a battery temperature. The controller 124 can be configured to monitor the one or more battery cells 104 via at least the thermocouple 156. Additionally, the controller 124 can be configured manage the thermal state of the one or more battery cells via management of an electrical connection between a power source 708 and the heating pad 108 via a circuit switch 710. Similarly, the controller 124 can be configured to manage the thermal state of the one or more battery cells 104 via management of a fluid connection between a coolant source 712 and the cooling plate via a coolant pump 714.

In some examples, the controller 124 can include a memory 702 that is configured to store one or more instructions that are executed by one or more processors of the controller to cause operations to be performed. The memory 702 can be volatile (such as RAM), non-volatile (such as ROM, flash memory, etc.) or some combination of the two. The memory 702 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store indications of battery temperature, battery temperature thresholds, battery temperature models, control programs for the circuit switch 710, control programs for the coolant pump 714, and other indications that are generated by and provided for the processor 704. Further, the memory 702 can comprise one or more instructions that are executed by the controller 124 and/or the processor 704 and cause the controller 124 to perform operations of the methods discussed below.

In some examples, one or more processors 704 can be configured to execute operations determined based on instructions stored in the memory 702. In particular, the processors 704 can be configured to receive thermocouple data from the thermocouple 156 (e.g., information that indicates the battery temperature(s) associated with the one or more battery cells 104), receive additional sensor data from the one or more additional temperature sensors, transmit commands that cause the circuit switch 710 and/or the coolant pump 714 to modify associated operations, and other control functions associated with the battery module 100. It should be noted that the processor 704 can be a central processing unit (CPU), a graphics processing units (GPU), both a CPU and a GPU, a microprocessor, and/or other processing units or components known in the art.

In some examples, a controller network 706 can be configured to connect the controller 124 with the thermocouple 156, the circuit switch 710, and/or the coolant pump 714. The controller network 706 can be a controller area network (CAN), a local area network (LAN), an intranet associated with a company or entity, a wireless network (e.g., controller 124 is further comprised of a transceiver that is configured to exchange, send, and receive wireless signals), a wired network, and/or other network that is capable of transmitting data, signals, and commands, between the controller 124 with the thermocouple 156, the circuit switch 710, and/or the coolant pump 714. Additionally, the controller network 706 can in communication with the controller 124 via the low voltage terminals 122.

In some examples, the controller 124 can be in communication with an electronic control module (ECM) of the external system 162 via the controller network 706 and/or other communication connection (e.g., wired communication connection, wireless communication connection, etc.). In particular, the controller 124 can transmit indications of battery status (e.g., output voltage, output amperage, output current, etc. detected by the electrical sensors associated with the internal circuit 140), activation commands for the heating system 158 and/or the cooling system 160, and/or other indications of battery module operation (e.g., provide maintenance for battery, battery charge depleted, etc.). Additionally, the controller 124 can receive indications from the ECM regarding a key-on state, a key-off state, power demands, and other requests from the external system 162. Accordingly, the controller 124 can be configured to maintain battery module operation and provide power to the external systems 162 based at least in part on information exchanged with the ECM of the external system 162.

The thermocouple 156, or other temperature sensor, can be configured to report a battery temperature that is measured based at least on a set of battery cells 104 within the battery module 100. As noted above, the thermocouple 156 is mounted on and/or in proximity to the plurality of battery cells 104 and determines the battery temperature of the set of battery cells 104. Additionally, the thermocouple 156 outputs an indication of the battery temperature to the controller 124. The indication can be transmitted from the thermocouple 156 to the controller 124 via the controller network 706, via direct transmission of the indication (e.g., wired or wireless connection between the thermocouple 156 and the controller 124), and/or otherwise conveyed to the controller 124. Accordingly, the thermocouple 156 is configured to measure and report the battery temperature of the plurality of battery cells 104 to the controller 124.

The controller 124 is configured to receive the indication of the battery temperature from the thermocouple 156 and cause the heating pad 108 provide thermal energy to the plurality of battery cells 104. In particular, the controller 124 can be connected, via the controller network 706, to the circuit switch 710. Additionally, the controller 124 causes electrical current to be directed to heating elements of the heating pad (e.g., the first heating element 408 and the second heating element 412), the heating elements converting the electrical current to thermal energy due to resistive properties of the heating elements. As a result, the battery temperature of the battery cells 104 is increased via the thermal contact between the heating elements and the one or more battery cells 104. Further, the controller 124 can be configured to store a temperature model associated with the battery module 100 and one or more temperature thresholds that are associated with an operational range of the battery module 100. Accordingly, the controller 124 can determine whether the battery temperature falls below or otherwise satisfies the one or more temperature thresholds associated with the operation range of the battery module 100 and cause the electrical current to be directed to the heating elements.

The controller 124 is configured to receive the indication of the battery temperature from the thermocouple 156 and cause the cooling plate 110 to extract thermal energy from the plurality of battery cells 104. In particular, the controller 124 can be connected, via the controller network 706, to the coolant pump 714 or a motor of the coolant pump. Additionally, the controller 124 causes coolant to be directed to the coolant channel 208, the coolant channel 208 configured to channel the coolant from the first coolant connector 116 to the second coolant connector 210 and to direct the coolant in proximity to the one or more battery cells 104. As a result, the battery temperature of the battery cells 104 is decreased via the thermal contact between the coolant channel, the coolant, and the one or more battery cells 104. Further, and as noted above, the temperature module stored by the controller 124 can be associated with one or more additional temperature thresholds that are associated with an operational range of the battery module 100. Accordingly, the controller 124 can be configured to determine whether the battery temperature exceeds or otherwise satisfies the one or more additional temperature thresholds associated with the operation range of the battery module 100 and cause the coolant to be directed to the coolant channel 208.

In some examples, the controller 124 receives the indication from the thermocouple 156 and determines whether the battery temperature indicated exceeds a temperature threshold. In particular, the temperature threshold can be a minimum temperature threshold that is associated with a minimum battery temperature that is associated with a lower bound of the operation range for the battery module 100 and the individual battery cells 104 of the battery module 100. Additionally, the controller 124 can be configured to receive the indication of the battery temperature and determine a thermal state of the battery module 100 based on a thermal model of the battery module. More specifically, the thermal model can be determined via a model battery module that is associated with a plurality of temperature sensors that report temperature data from a plurality of positions associated with the battery cells 104 of the model battery module. The temperature data can be associated with indications of battery temperature generated by a thermocouple on the model battery module that corresponds (e.g., is in substantially the same position) the thermocouple 156 on the battery module 100. Accordingly, the temperature data generated by the temperature sensors can be correlated with the indication of battery temperature generated by the thermocouple 156.

In some additional examples, the controller 124 can receive the indication from the thermocouple and determine, based at least on the thermal model, whether the temperature threshold is satisfied by the battery temperature determined from the indication. For example, the controller 124 can determine that the battery temperature exceeds the temperature threshold (e.g., battery temperature is greater than the minimum battery temperature) and determine that heating is not to be provided via the heating pad 108. Additionally, and in response to determining that the battery temperature exceeds the temperature threshold, the controller 124 can be configured to cause the circuit switch 710 to substantially prevent the heating pad 108 from receiving power from the power source 708. Alternatively, or in addition, the controller 124 can determine that the battery temperature is less than the temperature threshold (e.g., battery temperature is less than the minimum battery temperature) and determine that the heating pad 108 is to heat the battery module 100. Further, and in response to determining that the battery temperature is less than the temperature threshold, the controller 124 can be configured to cause the circuit switch 710 to enable the power source 708 to transmit power, via the circuit switch 710, to the heating pad 108. Accordingly the controller 124 can be configured to activate and deactivate the heating pad 108 through commands transmitted, via the controller network 706, to the circuit switch 710 that cause the circuit switch 710 to control whether power is provided from the power source 708 to the heating pad 108.

In some further examples, the controller 124 can receive the indication from the thermocouple and determine, based at least on the thermal model, whether an additional temperature threshold is satisfied by the battery temperature determined from the indication (e.g., the additional temperature threshold is associated with a maximum battery temperature). For example, the controller 124 can determine that the battery temperature is less than the temperature threshold (e.g., battery temperature is less than the maximum battery temperature) and determine that cooling is not to be provided via the cooling plate 110. Additionally, and in response to determining that the battery temperature is less than the temperature threshold, the controller 124 can be configured to cause the coolant pump 714 to substantially prevent the cooling plate 110 from receiving coolant from the coolant source 712. Alternatively, or in addition, the controller 124 can determine that the battery temperature is greater than the additional temperature threshold (e.g., battery temperature is greater than the maximum battery temperature) and determine that the cooling plate 110 is to cool the battery module 100. Further, and in response to determining that the battery temperature is greater than the additional temperature threshold, the controller 124 can be configured to cause the coolant pump 714 to activate and provide coolant from the coolant source 712 to the cooling plate 110. Accordingly the controller 124 can be configured to manage the cooling provided via the cooling plate 110 through commands transmitted, via the controller network 706, to the coolant pump 714 that cause the coolant pump 714 to modulate the amount of coolant extracted from the coolant source 712 and provided to the cooling plate 110.

It should be noted that the circuit switch 710 and/or the coolant pump 714 can be configured as a binary state control (e.g., the circuit switch 710/the coolant pump 714) such that the controller 124 can trigger an active state (e.g., power is provided via the circuit switch 710 and/or coolant is provided via the coolant pump 714) and an inactive state (e.g., power is not provided via the circuit switch 710 and/or coolant is not provided via the coolant pump 714). Alternatively, or in addition, the circuit switch 710 and/or the coolant pump 714 can be configured as a gradient control. More specifically, the circuit switch 710 and/or the coolant pump 714 can be controlled by the controller 124 to provide a variable amount of power (e.g., provided via the circuit switch 710) and/or a variable amount of coolant (e.g., provided via the coolant pump 714). The variable amount of power and/or the variable amount of coolant provided can be determined by the controller 124. The controller 124 can utilized a plurality of temperature thresholds to determine the variable amount of power and/or the variable amount of coolant. Further, the controller 124 can interpolate between pairs of temperature thresholds to further determine the variable amount of power and/or the variable amount of coolant to be provided to the heating pad 108 and the cooling plate 110 respectively. Accordingly, the controller 124 can be configured to control, either by modifying binary states of the circuit switch 710/the coolant pump 714 or determining variable amounts of power/coolant to be provided, the heating and cooling provided to the battery cells 104 via the heating pad 108 and the cooling plate 110.

Figure 8:
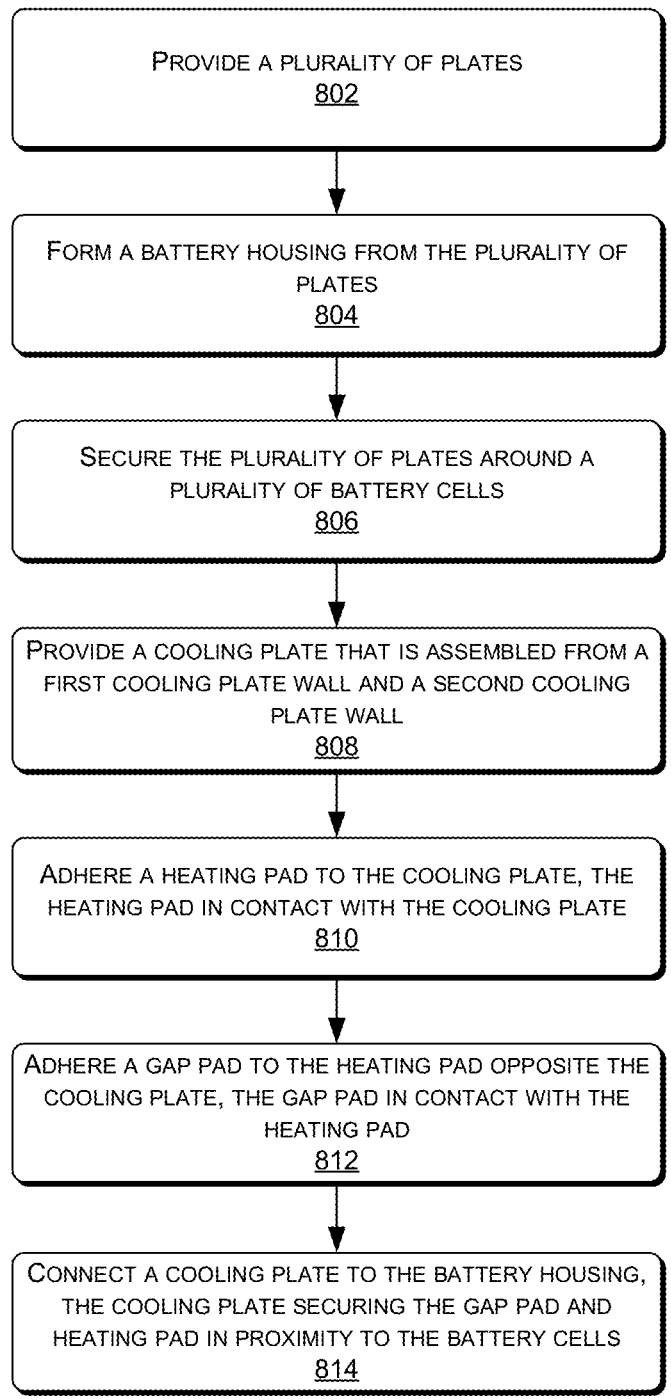
FIG. 8 illustrates a flowchart for a method of forming the battery module according to examples of the present disclosure.

FIG. 8 is a flowchart illustrating a method 800 of forming a battery module 100 according to examples of this disclosure. The method 800 may be performed by one or more human users. Additionally, and/or alternatively, one or more steps of the method 800 may be performed automatically without human intervention. The method 800 may include different and/or additions steps, or perform steps in a different order than described herein.

At step 802, the method 800 includes providing a plurality of plates. The plurality of plates can include the first side wall 126, the second side wall 128, the first end plate 130, the second end plate 132, the central wall 134, the front plate 118, and/or additional plates that are to be utilized in the battery module housing 102. Further, the plurality of plates can be provided to a fixture that is used to hold the plurality of plates while the battery module housing 102 is formed. In some examples, the fixture can be an adjustable welding fixture that includes moveable plates to be able to compress the battery module housing 102 while the battery module housing 102 is formed. Additionally, and/or alternatively, the fixture may be any fixture that maintains a position of the plurality of plate as the battery module housing 102 is formed.

At step 804, the method 800 includes forming the battery module housing 102 from the plurality of plates. In particular, the plurality of plates and/or a set of the plates can be utilized to form an exterior perimeter of the battery module housing 102. For example, the first end plate 130 and the second end plate 132 are positioned in the fixture at a first end and a second end of the battery module housing 102, respectively. Likewise, the first side wall 126 and the second side wall 128 are positioned in the fixture at a first side and a second side of the battery module housing 102, respectively. Additionally, the central wall 134 can be positioned between the first side wall 126 and the second side wall 128, extending from the first end plate 130 to the second end plate 132. Further, the central wall 134 can divide the battery module housing 102 into a first portion and a second portion of the battery module housing 102. Thus, the plurality of plates is arranged within the fixture to form the exterior perimeter of the battery module housing 102.

At step 806, the method 800 includes disposing a plurality of battery cells 104 within the battery module housing 102 and securing the plurality of plates around the plurality of battery cells 104. In some examples, a first set of the battery cells 104 are disposed within the first housing portion of the battery module housing 102, while a second set of battery cells 104 are disposed within the second housing portion of the battery module housing 102. Additionally, the first set of battery cells 104 can be coupled to each other and the central wall 134. Similarly, the second set of battery cells 104 can be coupled to each other and the central wall 134 opposite the first set of battery cells 104. It should be noted that coupling the first set of battery cells 104 and the second set of battery cells 104 to the central wall 134 and to each other can include applying an adhesive to the plurality of battery cells 104, the central wall 134, the first side wall 126, the second side wall 128, the first end plate 130, and/or the second end plate 132. Accordingly, the plurality of battery cells 104 are secured to the structural components of the housing (i.e., the plurality of plates) via the adhesive (or other fastener).

In some examples, securing the plurality of plates around the plurality of battery cells includes compressing the plurality of plates around the plurality of battery cells and securing the plurality of plates. In particular, the fixture is configured to apply compressive force to the first end plate 130 and the second end plate 132, compressing the battery module housing 102 and the plurality of battery cells 104 by adjusting a position of the compression plates within the fixture. Accordingly, the first end plate 130 and the first side wall 126 are welded to each other at a first corner of the battery module housing 102, and the first end plate 130 and the second side wall 128 are welded to each other at a second corner of the battery module housing 102. Similarly, the second end plate 132 and the first side wall 126 are welded to each other at a third corner of the battery module housing 102, and the second end plate 132 and the second side wall 128 are welded to each other at a fourth corner of the battery module housing 102. Further, the welding of the plurality of plates can secure the plurality of battery cells 104, under the applied compressive force, within the battery module housing 102.

At step 808, the cooling plate 110 can be assembled from the first cooling plate wall 204 and the second cooling plate wall 206 to form the coolant channel 208. In particular, the cooling plate 110 is configured to receive coolant at a first coolant connector 116 and output the coolant at a second coolant connector 210 after extracting thermal energy from the plurality of battery cells 104. Additionally, the slide plate 112 can be secured to the second cooling plate wall 206 as a protective surface for the cooling plate 110. Accordingly, the cooling plate 110 is configured to be in thermal communication with the plurality of battery cells 104 and to remove thermal energy from the plurality of battery cells 104 via the flow of coolant 310 received from the cooling system 160.

At step 810, the heating pad 108 can be adhered to or otherwise secured to (e.g., fasteners, a socket, etc.) the cooling plate 110. In particular, the heating pad 108 is configured to convert electrical energy into thermal energy and includes a first surface and a second surface. The first surface can include one or more heating elements (e.g., the first heating element 408 and the second heating element 410) that are configured as embedded heating elements and/or printed heating elements, wherein the one or more heating elements can be embedded into the first surface and/or printed onto the first surface. Alternatively, or in addition, the one or more heating elements can be laminated between the first surface and the second surface. Additionally, the heating pad 108 can be disposed adjacent to a third surface of the cooling plate 110, wherein the cooling plate includes the third surface and a fourth surface. It should be noted that the third surface can be defined by the first cooling plate wall 204 and the fourth surface can be defined by the second cooling plate wall 206. The third surface can be a substantially planar surface that is disposed adjacent to the second surface of the heating pad 108 and is in physical contact with the second surface after attachment of heating pad 108 to the cooling plate 110.

At block 812, the gap pad 106 can be provided and adhered or otherwise secured onto the first surface of the heating pad 108. As noted above, the gap pad 106 is a layer of a malleable material that is configured to conform to the bottom surface 146 of the plurality of battery cells 104 to create a substantially planar surface. Additionally, the gap pad 106 can be electrically resistive, substantially preventing electrical current from forming a circuit via the gap pad, and thermally conductive, enabling thermal energy to effectively be transferred between the plurality of battery cells 104, the heating pad 108, and the cooling plate 110. Accordingly, the gap pad 106 can be adhered to and/or otherwise coupled to the bottom surface 146 of the plurality of battery cells 104. Further, where a thermal interface material such as a paste or a liquid is utilized in place of the gap pad 106, the thermal interface material is applied to the heating pad 108 such that when the heating pad 108 placed adjacent to the battery cells 104, the thermal interface material is in physical contact between the heating plate 108 and the battery cells 104 while providing a thermal interface between the battery cells 104, the heating plate 108, and the cooling plate 110.

At block 814, the cooling plate 110 can be connected to the battery housing, via fasteners (e.g., bolts, screws, locking components, etc.), and secure the gap pad 106, the heating pad 108, and the cooling plate 110 to the battery module 100. In particular, the cooling plate can be connected to the battery module housing 102 such that the gap pad is in physical contact with the plurality of battery cells 104 and provides a thermal interface between the heating pad 108, the cooling plate 110, and the plurality of battery cells 104. Additionally, the cooling plate 110 can be configured to secure the gap pad 106 and the heating pad 108 adjacent to and in contact with the plurality of battery cells 104 such that the gap pad 106 and the heating pad 108 remain in contact with the plurality of battery cells 104. Accordingly, the battery module 100 can be assembled from the cooling plate 110 and the battery module housing 102 such that the battery cells 104, the gap pad 106, the heating pad 108, and the cooling pad 110 are in thermal communication.

Figure 9:
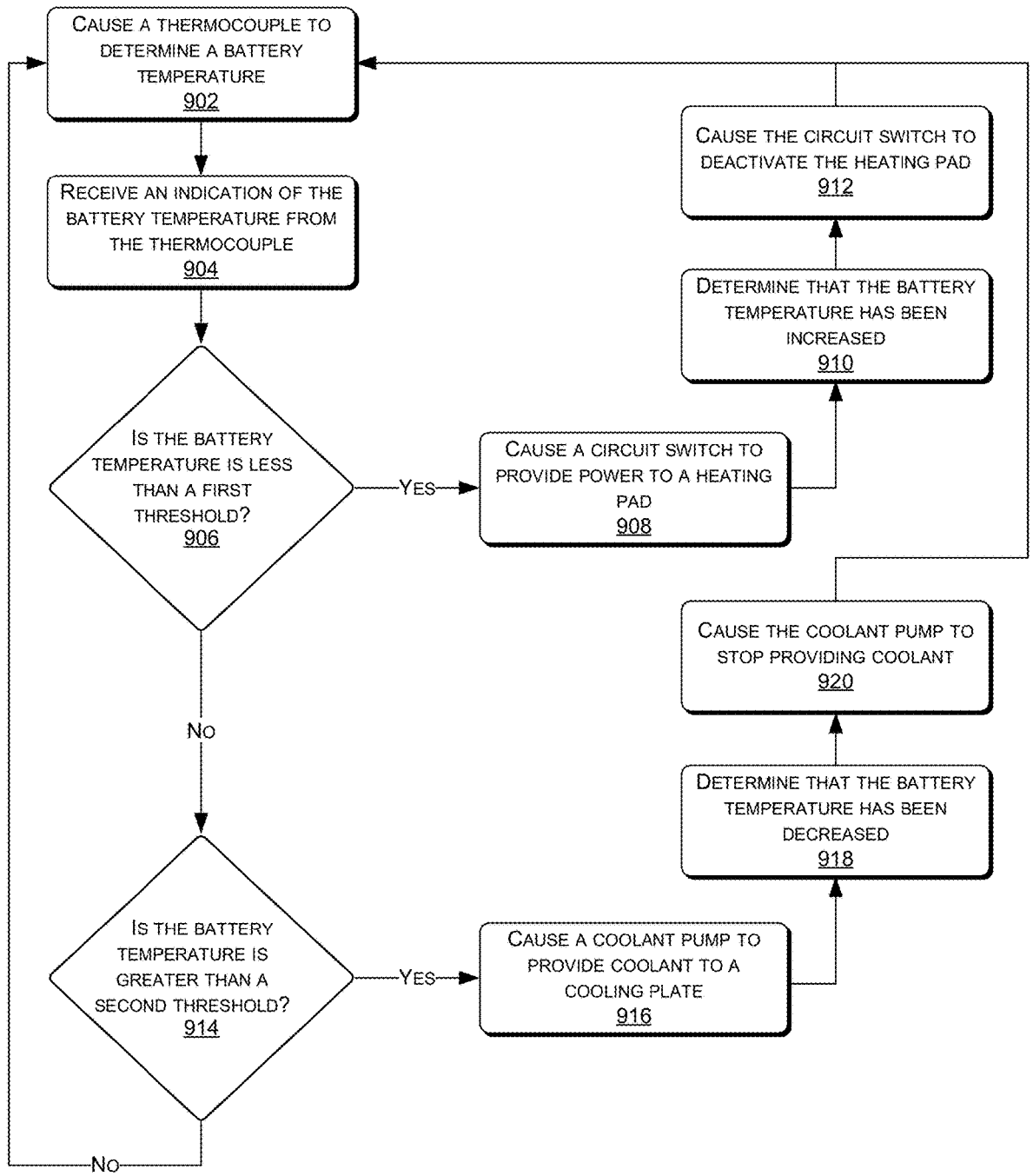
FIG. 9 illustrates a flowchart for a method executed by the controller of the battery module to activate and deactivate the heating pad and the cooling plate.

FIG. 9 is a flowchart illustrating a method 900 of controlling, via the controller 124, the heating pad 108 and the cooling plate 110 to manage a battery temperature detected by the thermocouple 156. The method 900 may be performed automatically without human intervention. The method 900 may include different and/or additions steps, or perform steps in a different order than described herein.

At block 902, the controller 124 can be configured to cause the thermocouple 156 to determine a battery temperature for the plurality of battery cells 104 within the battery module 100. In particular, the controller 124 can transmit a request, via the controller network 706, to the thermocouple 156 requesting a measurement of the battery temperature associated with the plurality of battery cells 104. The request can cause the thermocouple 156 to activate and/or detect the battery temperature. Additionally, the thermocouple 156 can generate an indication of the battery temperature and transmit the indication to the controller 124. Further, the controller 124 can be configured to transmit the request for the battery temperature on a periodic, aperiodic, continuous, and/or other scheduled basis. Accordingly, the controller 124 is configured to monitor the battery temperature via transmitting the request for the battery temperature while the battery module 100 is connected to and/or being utilized by an external system.

At block 904, the controller 124 receives the indication of the battery temperature from the thermocouple 156. In particular, the indication of the battery temperature can be utilized by the controller 124 to determine a thermal state of the battery module 100 based at least on a thermal model associated with the battery module 100. Additionally, the indication can be a digital indication (e.g., numerical indication) of the battery temperature and/or an analog indication (e.g. a voltage output by the thermocouple 156) of the battery temperature, wherein the controller 124 is configured to convert the indication to the battery temperature.

At block 906, the controller 124 can determine whether the battery temperature satisfies a first temperature threshold. In particular, the controller 124 can determine whether the battery temperature is less than the first temperature and, if the battery temperature is below the first temperature threshold, cause the heating pad 108 to activate. Additionally, the first temperature threshold can be configured such that the controller 124 activates the heating pad 108 based at least on the battery temperature of plurality of battery cells 104 approaching and/or falling below a lower bound of an operating temperature range for the battery module 100. For example, during start-up of an external system that receives power from the battery module 100 and/or during operations in a cold environment the battery temperature may be reduced such that the battery module 100 is less effective at outputting power, the lifetime of the battery module 100 is reduced, and/or other operating issues are introduced due to the battery temperature being less than the lower bound of the operating temperature range. The controller 124 can identify the thermal state of the battery module 100 being less than the lower bound by comparing the detected battery temperature received from the thermocouple 156 and determining that the detected battery temperature is less than the first temperature threshold. As a result, the controller 124 determines that the battery temperature is to be increased and activates the heating pad 108 to provide thermal energy to the plurality of battery cells 104. Accordingly, the controller 124 can proceed to block 908. Alternatively, the controller 124 can determine that the battery temperature is greater than the first temperature threshold and can proceed to block 914.

In some examples, the first temperature threshold can be configured such that the heating pad 108 is activated in response to the controller 124 determining that the battery temperature is less than the lower bound of the operating range for the battery module 100. In particular, the controller 124 can be configured to determine that utilization of the battery module 100 at the battery temperature would potentially result in inefficient performance of the battery module 100, damage to the battery module 100, and/or otherwise diminished utilization of the battery module 100. Alternatively, the first temperature threshold can be configured such that the heating pad 108 is activated in response to the controller 124 determining that the battery temperature is approaching the lower bound of the operating range. More specifically, the first temperature threshold can be configured such that the heating pad 108 is activated while the battery temperature is greater than the lower bound of the operating range to prevent the battery temperature from falling below the lower bound of the operating range. Further, the first temperature threshold can be configured as a first set of temperature thresholds, wherein the controller 124 is configured to modify the amount of thermal energy provided by the heating pad 108 to the plurality of battery cells 104 based at least on a determination that the battery temperature satisfies one or more thresholds of the first set of temperature thresholds. Accordingly, the controller 124 can be configured to determine that the heating pad 108 is to be activated to provide thermal energy to the plurality of battery cells 104.

At block 908, the controller 124 can cause a circuit switch 710 to provide power from the power source 708 to the heating pad 108. In particular, the controller 124 can output an activation command for the heating pad 108 that is transmitted, via the controller network 706, to the circuit switch 710. Additionally, the activation command can cause the circuit switch 710 to complete an electrical connection between the heating pad 108 and the power source 708, enabling the heating elements of the heating pad 108 to receive electrical current convert the electrical current to thermal energy. As noted above, the controller 124 can be configured to modify the amount of power provided to the heating pad 108 to modify the amount of thermal energy generated by the heating pad 108 and provided to the plurality of battery cells 104. Accordingly, the activation command can be configured to cause the circuit switch 710 to electrically connect the power source 708 and the heating circuit 114 and can cause the circuit switch 710 to modify the amount of power provided to the heating circuit 114 by the power source 708.

At block 910, the controller 124 can be configured to monitor the battery temperature while the heating pad 108 is active. In particular, the controller 124 can continue to transmit requests to the thermocouple 156 and receive one or more additional indications of the battery temperature. Additionally, the controller 124 can be configured to compare the one or more additional indications with a second temperature threshold, wherein a determination that the battery temperature exceeds the second temperature threshold causes the controller 124 to deactivate the heating pad 108. For example, the second temperature threshold can be equal to the first temperature threshold, wherein the heating pad 108 is deactivated when the battery temperature exceeds the battery temperature associated with the first temperature threshold and the second temperature threshold. Alternatively, the second temperature threshold can be greater than the first temperature threshold, wherein the heating pad 108 is deactivated when the battery temperature exceeds the second temperature threshold. Accordingly, the controller 124 can be configured to determine that the battery temperature of the battery module 100 has been increased above the second temperature threshold and is within the operating range of the battery module 100.

At block 912, the controller 124 can transmit a deactivation command to the circuit switch 710 and cause the circuit switch 710 to electrically disconnect the heating pad 108 from the power source 708. Additionally, the controller 124 can return to block 902 and continue monitoring the battery module 100.

At block 914, and after determining that the battery temperature is not less than the first temperature threshold, the controller can be configured to determine whether the battery temperature is greater than a third temperature threshold. In particular, the controller 124 can determine whether the battery temperature is greater than the third temperature and, if the battery temperature is above the third temperature threshold, cause the cooling plate 110 to receive coolant and cool the battery module 100. Additionally, the third temperature threshold can be configured such that the controller 124 causes the cooling plate 110 to receive coolant based at least on the battery temperature of plurality of battery cells 104 approaching and/or exceeding an upper bound of the operating temperature range for the battery module 100. For example, during extended operation of the external system that receives power from the battery module 100 and/or during operations in a hot environment the battery temperature may be elevated such that the battery module 100 is less effective at outputting power, the lifetime of the battery module 100 is reduced, the battery module is damaged, and/or other operating issues are introduced due to the battery temperature exceeding the upper bound of the operating temperature range. The controller 124 can identify the thermal state of the battery module 100 being greater than the upper bound by comparing the detected battery temperature received from the thermocouple 156 with the third temperature and determining that the detected battery temperature is greater than the third temperature threshold. As a result, the controller 124 determines that the battery temperature is to be decreased and activates the cooling plate 110 to remove thermal energy to the plurality of battery cells 104. Accordingly, the controller 124 can proceed to block 916. Alternatively, the controller 124 can determine that the battery temperature is less than the third temperature threshold and can return to monitoring the thermal state of the battery at block 902.

In some examples, the third temperature threshold can be configured such that the cooling plate 110 receives coolant in response to the controller 124 determining that the battery temperature is greater than the upper bound of the operating range for the battery module 100. In particular, the controller 124 can be configured to determine that utilization of the battery module 100 at the battery temperature would potentially result in inefficient performance of the battery module 100, damage to the battery module 100, and/or otherwise diminished utilization of the battery module 100. Alternatively, the third temperature threshold can be configured such that cooling plate 110 receives coolant in response to the controller 124 determining that the battery temperature is approaching the upper bound of the operating range. More specifically, the third temperature threshold can be configured such that coolant is provided to the cooling plate 110 while the battery temperature is less than the upper bound of the operating range to prevent the battery temperature from exceeding the upper bound of the operating range. Further, the third temperature threshold can be configured as a third set of temperature thresholds, wherein the controller 124 is configured to modify the amount of coolant provided to the cooling plate based at least on a determination that the battery temperature satisfies one or more thresholds of the third set of temperature thresholds. Accordingly, the controller 124 can be configured to determine that coolant is to be provided to the cooling plate 110 to extract thermal energy from the plurality of battery cells 104.

At block 916, the controller 124 can cause a coolant pump 714 and/or a motor of the coolant pump 714 to provide coolant from the coolant source 712 to the cooling plate 110. In particular, the controller 124 can output an additional activation command for the cooling plate 110 that is transmitted, via the controller network 706, to the coolant pump 714. Additionally, the additional activation command can cause the coolant pump 714 operate, extract coolant from the coolant source 712, and provide the coolant to the cooling plate 110, enabling the coolant to be directed in proximity to the plurality of battery cells by coolant channel 208. As noted above, the controller 124 can be configured to modify the amount of coolant provided to the cooling plate 110 by modifying rotational speed of the motor, the rate of coolant extraction by the coolant pump 714, and/or by throttling a fluid connection between the coolant source 712 and the cooling plate 110. Accordingly, the additional activation command can be configured to cause the coolant pump 714 to provide coolant to the cooling plate 110.

At block 918, the controller 124 can be configured to monitor the battery temperature while the cooling plate 110 is active. In particular, the controller 124 can continue to transmit requests to the thermocouple 156 and receive one or more additional indications of the battery temperature. Additionally, the controller 124 can be configured to compare the one or more additional indications with a fourth temperature threshold, wherein a determination that the battery temperature is less than the fourth temperature threshold causes the controller 124 to deactivate the cooling plate 110 and/or prevent the cooling plate from receiving additional coolant. For example, the fourth temperature threshold can be equal to the third temperature threshold, wherein the cooling plate 110 is deactivated when the battery temperature falls below the battery temperature associated with the third temperature threshold and the fourth temperature threshold. Alternatively, the fourth temperature threshold can be less than the first temperature threshold, wherein the cooling plate 110 is deactivated when the battery temperature falls below the fourth temperature threshold. Accordingly, the controller 124 can be configured to determine that the battery temperature of the battery module 100 has been lowered below the fourth temperature threshold and is within the operating range of the battery module 100.

At block 920, the controller 124 can transmit an additional deactivation command to the coolant pump 714 and cause the coolant pump to substantially prevent the cooling plate 110 from receiving additional coolant. Additionally, the controller 124 can return to block 902 and continue monitoring the battery module 100.

INDUSTRIAL APPLICABILITY

The present disclosure describes example systems and methods for achieving a desired thermal state of a plurality of battery cells within a battery module. The example systems and methods described herein utilize a heating pad disposed substantially adjacent to the plurality of battery cells and a cooling plate outward of the heating pad from the battery cells. In such examples, a controller is configured to monitor the thermal state of the battery module via a thermocouple that reports a battery temperature associated with the plurality of battery cells. Additionally, the example controller utilizes a thermal model of the battery module to determine whether the battery temperature satisfies one or more temperature thresholds indicating that the battery temperature is to be modified through provision of heating via the heating pad or cooling via the cooling pad. Further, the example controller is configured to modulate the heating provided via the heating pad and the cooling provided via the cooling plate through commands transmitted to a circuit switch and a coolant pump that are utilized to modulate activity of the heating pad and the cooling plate.

Accordingly, an independent heating pad and an independent cooling plate can be utilized by the controller to maintain the battery temperature within an operational range of the plurality battery cells to prevent damage the plurality of battery cells and to extend the service life of the plurality of battery cells. The independent heating pad can be utilized to increase the battery temperature for start-up, in cold environments, and in response to a decreased battery temperature such that operation of the battery module is maintained. Similarly, the independent cooling plate can be utilized to reduce the battery temperature during extended operation, increased thermal loads generated by the plurality of batter cells, and in response to an increased battery temperature to prevent battery cell damage, prevent the battery module from being compromised, and to maintain consistent operation of the battery module. Additionally, the controller can be configured to detect that the battery module is utilized during a start-up of an external system, in a cold environment, or that the battery temperature is below a temperature threshold and activate the heating pad. Similarly, the controller can be configured to determine that the battery module is utilized for extended operation, under increased thermal loads, or that the battery temperature exceeds a temperature threshold and activate the cooling plate. By activating and deactivating the heating pad and the cooling plate, the controller can maintain the battery temperature within an operating range of the battery and extend the lifetime of the battery module and the efficiency of the battery module.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system, comprising:
a housing configured to support a plurality of battery cells, the housing comprising:
 a first side wall,
 a second side wall disposed opposite the first side wall,
 a first end plate coupled to the first side wall and the second side wall,
 a second end plate coupled to the first side wall and the second side wall, the second end plate disposed opposite the first end plate,
 a central wall extending from the first end plate to the second end plate, and disposed substantially parallel to the first side wall, and
 a thermal interface material extending from the first side wall to the second side wall, and from the first end plate to the second end plate, the thermal interface material being disposed substantially perpendicular to the first side wall, the second side wall, the first end plate, and the second end plate;
a heating pad including a heating element configured to raise a temperature of the plurality of battery cells, the heating pad having
 a first surface disposed adjacent to the thermal interface material,
 a second surface opposite the first surface, and
 a central slot extending from the first surface to the second surface, at least part of the central wall extending through the central slot from the first surface to the second surface;
a cooling plate configured to lower the temperature of the plurality of battery cells, the cooling plate including a coolant channel configured to direct coolant through at least part of the cooling plate, the cooling plate having a third surface disposed adjacent to the second surface of the heating pad, and a fourth surface opposite the third surface; and
a controller programmed to:
 receive a temperature indication determined by a temperature sensor disposed at a location within the housing and proximate at least one battery cell of the plurality of battery cells;
 determine the temperature of the plurality of battery cells based at least in part on the temperature indication;
 cause energy to be directed from a power source to the heating element based at least in part on the determined temperature of the plurality of battery cells being less than a first temperature threshold; and
 cause coolant to be directed from a coolant source to the coolant channel based at least in part on the determined temperature of the plurality of battery cells being greater than a second temperature threshold, the second temperature threshold being greater than the first temperature threshold.

2. The system of claim 1, further comprising a substantially planar slide plate disposed adjacent to the fourth surface of the cooling plate, wherein the slide plate is configured to be positioned between the fourth surface of the cooling plate and an inner surface of an external housing when the housing is installed within the external housing.

3. The system of claim 1, wherein:
the plurality of battery cells includes a first battery cell stack and a second battery cell stack; and
the heating element is a first heating element associated with the first battery cell stack and the heating pad includes a second heating element associated with the second battery cell stack, wherein
 the central slot is disposed between the first heating element and the second heating element, the at least part of the central wall extends through the cooling plate, and the first heating element and the second heating element are resistive heating elements that convert the energy from the power source to heat.

4. The system of claim 1, further comprising a front plate that is connected to the first end plate, wherein:
a set of high voltage terminals are mounted on the front plate and are electrically connected to the plurality of battery cells;
a set of low voltage terminals are mounted on the front plate and electrically connect the power source with the controller and the heating element;
the first end plate defines a first opening; and
the front plate defines a second opening, the first opening and the second opening permitting the coolant to pass into the coolant channel.

5. The system of claim 4, further comprising one or more busbars and an internal circuit, wherein:
the one or more busbars are coupled to the plurality of battery cells;
the internal circuit is configured to electrically connect the plurality of battery cells to the set of high voltage terminals via at least the one or more busbars;
the controller is programmed to determine the temperature of the plurality of battery cells based at least in part on the temperature indication and using a stored thermal model corresponding to the plurality of battery cells,
the thermal model being configured to correlate the temperature indication with one or more stored temperature indications based on the location of the temperature sensor within the housing.

6. The system of claim, 9 wherein:
the temperature sensor comprises a thermocouple operably connected to the controller;
the first end plate defines an opening; and
the system further includes:
a nozzle coupled to the first cooling plate wall and fluidly connected to the coolant channel,
a coolant connector extending from the nozzle and through the opening in the first end plate, the coolant connector being fluidly connected to the coolant channel via the nozzle,
a first seal forming a substantially fluid-tight seal between the coolant connector and the first end plate, and
a second seal forming a substantially fluid-tight seal between the coolant connector and the nozzle.

7. The system of claim 1, further comprising a motor operably connected to the controller, and a coolant pump connected to the motor, the coolant pump being configured to direct coolant from the coolant source to the coolant channel based at least in part on a command signal from the controller.

8. The system of claim 1, wherein the heating element comprises a positive temperature coefficient (PTC) heating element printed onto the heating pad and is electrically connected, via a heating circuit, with the power source that is operated by the controller to activate and deactivate the heating pad.

9. The system of claim 1, wherein the cooling plate comprises:
a first cooling plate wall forming the third surface and disposed in contact with the second surface of the heating pad, the first cooling plate wall forming a first portion of the coolant channel and including a fifth surface opposite the third surface of the cooling plate; and
a second cooling plate wall separate from the first cooling plate wall, the second cooling plate wall:
forming the fourth surface of the cooling plate,
including a sixth surface opposite the fourth surface, the sixth surface being sealed to the fifth surface of the first cooling plate wall, and
forming a second portion of the coolant channel opposite the first portion of the coolant channel.

10. The system of claim 1, wherein the temperature sensor comprises a first temperature sensor, the system further comprising:
a second temperature sensor separate from the first temperature sensor,
wherein:
one or more batteries of the plurality of battery cells is disposed adjacent to the first side wall and the central wall, and is in thermal contact with a first portion of the coolant channel,
the first temperature sensor is configured to determine a temperature of the one or more batteries,
a remainder of the plurality of batteries is disposed adjacent to the second side wall and the central wall, and is in thermal contact with a second portion of the coolant channel,
the second temperature sensor is configured to determine a temperature of the remainder of the plurality of batteries,
the controller is configured to cause a first amount of coolant to be directed from the coolant source to the first portion of the coolant channel based on the first temperature, and
the controller is configured to cause a second amount of coolant to be directed to the second portion of the coolant channel based on the second temperature.

11. A battery module, comprising:
a plurality of battery cells;
a thermal interface material that is adhered to the plurality of batteries; and
a housing that includes:
a first end plate defining an opening,
a second end plate disposed opposite the first end plate,
a first side plate extending from the first end plate to the second end plate,
a second side plate disposed opposite the first side plate and extending from the first end plate to the second end plate, wherein the plurality of battery cells is disposed between the first end plate and the second end plate, and between the first side plate and the second side plate; and
a central wall extending from the first end plate to the second end plate;
a heating pad comprising a first surface in contact with the thermal interface material, a second surface, and a central slot extending from the first surface to the second surface, wherein
at least part of the central wall extends through the central slot, and
the first surface disposed adjacent to the thermal interface material and includes a heating element that provides thermal energy to the plurality of battery cells via the thermal interface material;
a cooling plate comprising:
a first cooling plate wall forming a third surface of the cooling plate in contact with the second surface, and a second cooling plate wall separate from the first cooling plate wall and sealed to the first cooling plate wall, the second cooling plate wall forming a fourth surface of the cooling plate,
the cooling plate configured to direct coolant through a coolant channel to remove thermal energy from the plurality of battery cells via the heating pad and the thermal interface material, the first cooling plate wall forming a first portion of the coolant channel and the second cooling plate wall forming a second portion of the coolant channel;
a nozzle coupled to the first cooling plate wall and fluidly connected to the coolant channel,
a coolant connector extending from the nozzle and through the opening in the first end plate, the coolant connector being fluidly connected to the coolant channel via the nozzle,
a first seal forming a substantially fluid-tight seal between the coolant connector and the first end plate, and
a second seal forming a substantially fluid-tight seal between the coolant connector and the nozzle.

12. The battery module of claim 11, further comprising a controller, and a thermocouple operably connected to the controller, wherein the thermocouple is mounted to a top surface of the plurality of battery cells opposite the thermal interface material and is configured to determine a battery temperature of the plurality of battery cells.

13. The battery module of claim 12, further comprising a switch operably connected to the controller, wherein the controller receives an indication of the battery temperature from the thermocouple and causes the switch to route power from a power source to the heating pad via a heating circuit.

14. The battery module of claim 12, further comprising a motor operably connected to the controller, and a coolant pump connected to the motor, wherein the controller receives an indication of battery temperature from the thermocouple and causes the motor to power the coolant pump to extract coolant from a coolant source and provide the coolant to the cooling plate.

15. The battery module of claim 11, wherein:
the plurality of battery cells includes a first set of battery cells, and a second set of battery cells separated from the first set of battery cells by the central wall;
the heating pad includes a first heating element that is positioned substantially adjacent to the first set of battery cells and a second heating element that is positioned substantially adjacent the second set of battery cells; and
the coolant channel is configured such that a first amount of coolant is provided to the first set of battery cells and a second amount of coolant is provided to the second set of battery cells, the first amount of coolant being substantially equal to the second amount of coolant.

16. A method, comprising:
connecting a first side plate to a first end plate;
connecting the first side plate to a second end plate disposed opposite the first end plate, the first side plate extending substantially perpendicular to the first end plate and the second end plate;
connecting a second side plate to the first end plate and the second end plate, the second side plate extending substantially parallel to the first side plate, the first end plate, the second end plate, the first side plate, and the second side plate forming at least part of a battery module housing;
connecting a center plate to the first end plate and the second end plate, the center plate extending substantially parallel to the first side plate and the second side plate;
connecting a front plate to the first end plate, the front plate having a set of high voltage terminals configured to form an electrical connection with a plurality of battery cells disposed adjacent to the center plate;
providing a cooling plate comprised of a first surface and a second surface opposite the first surface;
adhering a heating pad to the first surface of the cooling plate, the heating pad having a third surface and a fourth surface in contact with the cooling plate opposite the third surface, at least part of the center plate extending through the heading pad from the third surface to the fourth surface;
applying a thermal interface material to the third surface of the heating pad;
connecting the cooling plate to the battery module housing such that the cooling plate is in thermal communication with the plurality of battery cells, the cooling plate securing the thermal interface material in contact with the plurality of battery cells and the heating pad in thermal communication with the plurality of battery cells;
providing a temperature sensor disposed at a location within the battery module housing and proximate at least one battery cell of the plurality of battery cells;
providing a controller operably connected to a component of the heating pad and the temperature sensor; and
programming a controller to:
receive a temperature indication determined by the temperature sensor,
determine the temperature of the plurality of battery cells based at least in part on the temperature indication and using a stored thermal model corresponding to the plurality of battery cells, and
control operation of the component of the heating pad or operation of a coolant pump fluidly connected to the cooling plate based at least in part on the determined temperature.

17. The method of claim 16, wherein the electrical connection between the plurality of battery cells and the set of high voltage terminals further comprises connecting the plurality of battery cells to one or more busbars, the one or more busbars electrically connected to the set of high voltage terminals by an internal circuit of the battery module.

18. The method of claim 17, further comprising electrically connecting one or more heating elements of the heating pad to a low power circuit, the low power circuit configured to draw power from the internal circuit and provide the power to the one or more heating elements.

19. The method of claim 16, further comprising providing a controller that is configured to activate and deactivate the heating pad and the cooling plate, wherein the controller is in communication with a circuit switch associated with the heating pad that enables the heating pad to receive power while activated and a coolant pump associated with the cooling plate that enables the cooling plate to receive coolant while activated.

20. The method of claim 16, further comprising providing a slide plate positioned adjacent to the second surface of the cooling plate, the slide plate configured to protect the battery module, the thermal interface material, the heating pad, and the cooling plate during installation within an exterior housing, wherein the exterior housing is configured to receive the battery module, the thermal interface material, the heating pad, the cooling plate, and the slide plate.

\* \* \* \* \*